United States Patent
Tian et al.

(10) Patent No.: US 12,550,145 B2
(45) Date of Patent: Feb. 10, 2026

(54) UPLINK CONTROL INFORMATION TRANSMISSION ON AUTONOMOUS UPLINK IN NEW RADIO-UNLICENSED (NR-U)

(71) Applicant: QUALCOMM INCORPORATED, San Diego, CA (US)

(72) Inventors: Qingjiang Tian, San Diego, CA (US); Xiaoxia Zhang, San Diego, CA (US); Jing Sun, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,197

(22) Filed: Feb. 27, 2020

(65) Prior Publication Data

US 2020/0196305 A1  Jun. 18, 2020

Related U.S. Application Data

(63) Continuation of application No. 16/359,247, filed on Mar. 20, 2019.

(Continued)

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1664* (2013.01); *H04L 1/1685* (2013.01);
(Continued)

(58) Field of Classification Search
None
See application file for complete search history.

(56) References Cited

U.S. PATENT DOCUMENTS 10,992,423 B2 * 4/2021 Parkvall ............ H04W 72/1268
11,540,257 B2   12/2022 Tian et al.
(Continued)

FOREIGN PATENT DOCUMENTS

CN    104885376 A    9/2015
CN    107182126 A    9/2017
(Continued)

OTHER PUBLICATIONS

U.S. Appl. No. 62/544,201, priority document for Yang et al. (US 2020/0383132) (Year: 2017).*
(Continued)

*Primary Examiner* — Faruk Hamza
*Assistant Examiner* — Cassandra L Decker
(74) *Attorney, Agent, or Firm* — Harrity & Harrity, LLP

(57) ABSTRACT

Wireless communications systems and methods related to communicating uplink control information (UCI) in a network operating over multiple aggregated unlicensed carriers are provided. A first wireless communication device communicates, with a second wireless communication device, a downlink communication signal. The first wireless communication device communicates, with the second wireless communication device, an unscheduled uplink communication signal including an uplink report associated with the downlink communication signal, the unscheduled uplink communication signal communicated based on a listen-before-talk (LBT) procedure. The uplink report includes at least one of an acknowledgement (ACK) for data in the downlink communication signal, a negative-acknowledgement (NACK) for the data in the downlink communication (Continued)

signal, or channel information based at least on the downlink communication signal.

26 Claims, 14 Drawing Sheets

Related U.S. Application Data

(60) Provisional application No. 62/647,485, filed on Mar. 23, 2018.

(51) Int. Cl.

| | | |
|---|---|---|
| *H04L 1/1812* | (2023.01) | |
| *H04L 1/1829* | (2023.01) | |
| *H04L 1/1867* | (2023.01) | |
| *H04L 5/00* | (2006.01) | |
| *H04W 24/10* | (2009.01) | |
| *H04W 28/02* | (2009.01) | |
| *H04W 28/06* | (2009.01) | |
| *H04W 72/02* | (2009.01) | |
| *H04W 72/0446* | (2023.01) | |
| *H04W 72/0453* | (2023.01) | |
| *H04W 72/20* | (2023.01) | |
| *H04W 74/00* | (2009.01) | |
| *H04W 74/08* | (2024.01) | |
| *H04W 74/0808* | (2024.01) | |
| *H04W 74/0816* | (2024.01) | |
| *H04W 74/0833* | (2024.01) | |
| *H04W 88/02* | (2009.01) | |
| *H04W 92/10* | (2009.01) | |
| *H04W 88/08* | (2009.01) | |

(52) U.S. Cl.
CPC .......... *H04L 1/1812* (2013.01); *H04L 1/1829* (2013.01); *H04L 1/1867* (2013.01); *H04L 5/0033* (2013.01); *H04L 5/0046* (2013.01); *H04L 5/0055* (2013.01); *H04L 5/0064* (2013.01); *H04L 5/0076* (2013.01); *H04W 24/10* (2013.01); *H04W 28/0205* (2013.01); *H04W 28/06* (2013.01); *H04W 72/02* (2013.01); *H04W 72/0446* (2013.01); *H04W 72/0453* (2013.01); *H04W 72/20* (2023.01); *H04W 74/004* (2013.01); *H04W 74/0808* (2013.01); *H04W 74/0816* (2013.01); *H04W 74/0833* (2013.01); *H04W 74/0866* (2013.01); *H04W 88/02* (2013.01); *H04W 88/08* (2013.01); *H04W 92/10* (2013.01)

(56) References Cited

U.S. PATENT DOCUMENTS

| | | | |
|---|---|---|---|
| 2008/0279211 A1 | 11/2008 | Chitrapu et al. | |
| 2017/0013641 A1* | 1/2017 | Patel | H04L 1/1812 |
| 2017/0117991 A1* | 4/2017 | Liu | H04L 1/0006 |
| 2017/0230838 A1 | 8/2017 | Yerramalli et al. | |
| 2017/0257848 A1* | 9/2017 | Froberg | H04L 5/001 |
| 2017/0280430 A1* | 9/2017 | Yin | H04W 76/16 |
| 2017/0280440 A1* | 9/2017 | Oh | H04W 74/006 |
| 2017/0289853 A1 | 10/2017 | Ahn et al. | |
| 2017/0310426 A1 | 10/2017 | Fan et al. | |
| 2017/0340838 A1 | 11/2017 | Sadowski et al. | |
| 2017/0346605 A1 | 11/2017 | Chendamarai et al. | |
| 2017/0347353 A1 | 11/2017 | Yerramalli et al. | |
| 2018/0006791 A1* | 1/2018 | Marinier | H04L 1/0057 |
| 2018/0027549 A1* | 1/2018 | Wang | H04L 5/0057 370/329 |
| 2018/0027589 A1 | 1/2018 | Yang | |
| 2018/0206225 A1* | 7/2018 | Li | H04W 72/044 |
| 2018/0278398 A1* | 9/2018 | Ahn | H04L 5/00 |
| 2019/0037601 A1* | 1/2019 | Noh | H04W 72/0413 |
| 2019/0053206 A1* | 2/2019 | Babaei | H04L 1/1883 |
| 2019/0053265 A1* | 2/2019 | Kim | H04L 5/0044 |
| 2019/0082452 A1* | 3/2019 | Zheng | H04L 5/0007 |
| 2019/0104535 A1* | 4/2019 | Golitschek Edler von Elbwart ... H04L 1/1812 |
| 2019/0150184 A1* | 5/2019 | Golitschek Edler von Elbwart ... H04W 72/0406 370/329 |
| 2019/0174524 A1* | 6/2019 | Yoshimura | H04L 1/1819 |
| 2019/0199477 A1* | 6/2019 | Park | H04L 27/2602 |
| 2019/0260551 A1* | 8/2019 | Baldemair | H04L 27/26025 |
| 2019/0268912 A1* | 8/2019 | Myung | H04W 72/0446 |
| 2019/0297620 A1 | 9/2019 | Tian et al. | |
| 2019/0327755 A1* | 10/2019 | Xiong | H04L 5/0055 |
| 2019/0342037 A1 | 11/2019 | Karaki et al. | |
| 2019/0356446 A1* | 11/2019 | Kim | H04L 5/0053 |
| 2019/0393987 A1* | 12/2019 | Hong | H04L 1/0057 |
| 2019/0394798 A1* | 12/2019 | Tomeba | H04W 74/006 |
| 2020/0037359 A1 | 1/2020 | Wang et al. | |
| 2020/0059321 A1* | 2/2020 | Koorapaty | H04W 72/0406 |
| 2020/0076670 A1* | 3/2020 | Liu | H04L 5/0007 |
| 2020/0084762 A1* | 3/2020 | Gou | H04B 7/088 |
| 2020/0136750 A1* | 4/2020 | Baldemair | H04L 1/1607 |
| 2020/0154404 A1* | 5/2020 | Goktepe | H04W 72/0466 |
| 2020/0213057 A1* | 7/2020 | Bala | H04L 5/0023 |
| 2020/0214024 A1* | 7/2020 | Lee | H04B 7/0626 |
| 2020/0296695 A1* | 9/2020 | Gao | H04L 1/18 |
| 2020/0314820 A1* | 10/2020 | Kim | H04W 72/1289 |
| 2020/0383132 A1* | 12/2020 | Yang | H04W 74/0808 |
| 2020/0403735 A1* | 12/2020 | Zhao | H04L 1/1896 |

FOREIGN PATENT DOCUMENTS

| | | | | |
|---|---|---|---|---|
| EP | 3429287 A1 | 1/2019 | | |
| WO | WO-2016073039 A1 * | 5/2016 | .......... | H04L 5/0094 |
| WO | 2017077034 A1 | 5/2017 | | |
| WO | 2017130991 A1 | 8/2017 | | |
| WO | 2017152664 A1 | 9/2017 | | |
| WO | WO-2019030237 A1 * | 2/2019 | .......... | H04L 5/0053 |

OTHER PUBLICATIONS

International Search Report and Written Opinion—PCT/US2019/023435—ISA/EPO—Jun. 13, 2019.
Lenovo: "UCI Transmission on LAA SCell", 3GPP Draft; R1-164647 UCI, 3rd Generation Partnership Project (3GPP), Mobile Competence Centre, 650, Route Des Lucioles ; F-06921 Sophia-Antipolis Cedex, France, vol. RAN WG1, No. Nanjing, China; May 23, 2016-May 27, 2016, May 13, 2016 (May 13, 2016), 3 Pages, XP051096873, Retrieved from the Internet: URL: https://www.3gpp.org/ftp/tsg_ran/WG1_RL1/TSGR1_85/Docs/ [retrieved on May 13, 2016].
Huawei, et al., "Remaining Details for AUL HARQ Operation", 3GPP TSG RAN WG1 Meeting #92, R1-1801374, Athens, Greece, Feb. 26-Mar. 2, 2018, 5 Pages.

* cited by examiner

UPLINK CONTROL INFORMATION TRANSMISSION ON AUTONOMOUS UPLINK IN NEW RADIO-UNLICENSED (NR-U)

CROSS REFERENCE TO RELATED APPLICATIONS

The present application is a continuation application of U.S. Non-Provisional patent application Ser. No. 16/359,247, filed Mar. 20, 2019, which claims priority to and the benefit of U.S. Provisional Patent Application No. 62/647,485, filed Mar. 23, 2018, the disclosure of each of which is hereby incorporated by reference in its entirety as if fully set forth below and for all applicable purposes.

TECHNICAL FIELD

This application relates to wireless communication systems, and more particularly to communicating uplink control information (UCI) in a network that operates over multiple aggregated unlicensed or shared frequency bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR may operate over a wider bandwidth (BW) at higher frequencies than LTE. In addition, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared communication medium or shared channel is to use a listen-before-talk (LBT) procedure to ensure that the shared channel is clear before accessing the shared channel. Certain wireless communication networks may aggregate a high-frequency carrier or band with a low-frequency unlicensed carrier or band for communications. However, different frequency bands may have different channel properties (e.g., path loss). In some instances, a UE may not be able to transmit an uplink (UL) communication signal in the high-frequency band, for example, due to a maximum permissible exposure (MPE) constraint. Thus, the high-frequency band may only be used for downlink (DL) communications. In addition, channel accesses in the high-frequency band may be asynchronous with channel accesses in the low-frequency band. Thus, while a BS may gain access to the high-frequency band, the BS may not necessarily gain access to the low-frequency band.

The asynchronous channel accesses and different channel properties between the high-frequency band and the low-frequency band can be problematic for DL communications that require UL feedbacks and/or reports. For example, hybrid automatic repeat request (HARQ) and link adaptation are commonly used in wireless communication networks to improve system performance. DL HARQ requires a UE to transmit an acknowledgement/negative-acknowledgement (ACK/NACK) for DL data received from a BS. Link adaptation requires a UE to report channel information (CSI) based on DL reference signals received from a BS. While a BS may gain channel access in a frequency band (e.g., the high-frequency band) for a DL communication with a UE and may schedule the UE to transmit a response in the same frequency band, the UE may not be able to transmit the response in the same frequency band due to certain capability limitations of the UE. At the same time, the BS may not be able to gain channel access to a different frequency band (e.g., the low-frequency band). As such, the BS may not be able to schedule the UE for a UL response in a different frequency band, and thus the BS may not receive a UL response for the DL communication.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including communicating, by a first wireless communication device with a second wireless communication device, a downlink communication signal; and communicating, by the first wireless communication device with the second wireless communication device, an unscheduled uplink communication signal including an uplink report associated with the downlink communication signal, the unscheduled uplink communication signal communicated based on a listen-before-talk (LBT) procedure.

In an additional aspect of the disclosure, an apparatus including a transceiver configured to communicate, with a second wireless communication device, a downlink communication signal; and communicate, with the second wireless communication device, an unscheduled uplink communication signal including an uplink report associated with the downlink communication signal, the unscheduled uplink communication signal communicated based on a listen-before-talk (LBT) procedure.

In an additional aspect of the disclosure, a non-transitory computer-readable medium having program code recorded thereon, the program code including code for causing a first wireless communication device to communicate, with a second wireless communication device, a downlink communication signal; and code for causing the first wireless communication device to communicate, with the second wireless communication device, an unscheduled uplink communication signal including an uplink report associated with the downlink communication signal, the unscheduled uplink communication signal communicated based on a listen-before-talk (LBT) procedure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
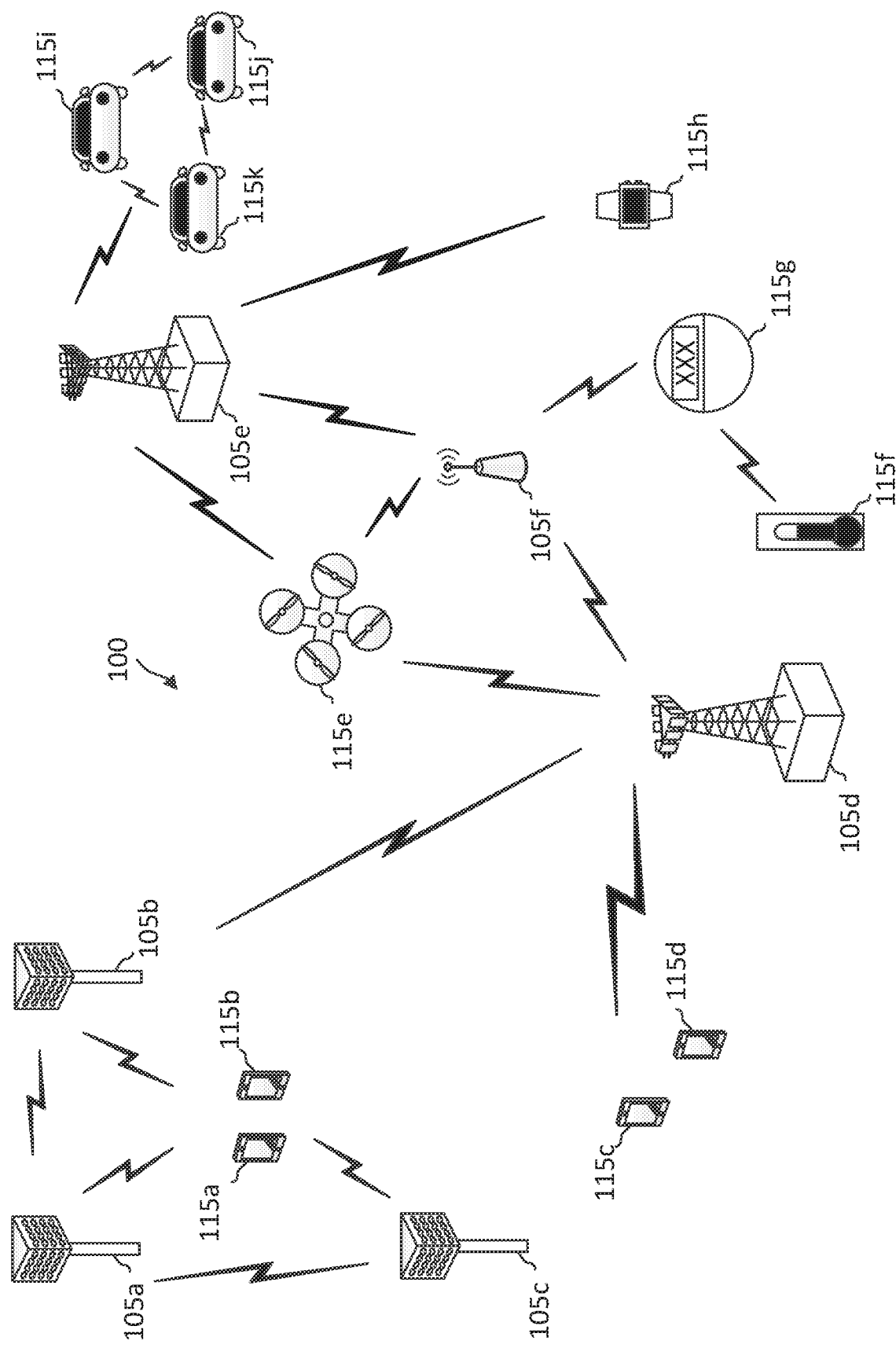
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of lower than 3 GHz FDD/TDD implementations, subcarrier spacing may occur with 15 kHz, for example over 1, 5, 10, 20 MHz, and the like BW. For other various outdoor and small cell coverage deployments of TDD higher than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for communicating uplink control information (UCI) autonomously in a network that operates over multiple aggregated unlicensed or shared frequency bands. The UCI may include hybrid automatic request (HARQ) acknowledgement/negative-acknowledgements (ACK/NACKs), channel state information (CSI), and/or any information or responses related to uplink (UL) and/or downlink (DL) communications. The UCI may also be referred to as normal UCI. For example, a BS may communicate with a UE using a high-frequency band paired with a low-frequency shared or unlicensed frequency band. The BS may allocate resources in the low-frequency band for the UE to transmit UL data in an autonomous mode. An autonomous uplink (AUL) transmission refers to a transmission from the UE to the BS without a scheduling grant issued by the BS. The BS may broadcast the AUL data resource configuration. The disclosed embodiments allow autonomous or unscheduled transmissions of normal UCI on AUL data resources. For example, in response to a DL communication received from the BS in the high-frequency band and/or the low-frequency band, the UE may transmit unscheduled normal UCI using an AUL data resource in the low-frequency band based on the AUL data resource configuration.

In one embodiment, the BS may configure the UE to transmit unscheduled UCI as a data packet or a transport block (TB) using AUL data resources in the low-frequency band. For example, the BS may configure separate AUL data resources in the low-frequency band for AUL data transmissions and for unscheduled normal UCI transmissions. The BS may further assign separate HARQ processes for the AUL data transmissions and for the unscheduled normal UCI transmissions.

In one embodiment, the BS may configure the UE to transmit unscheduled normal UCI along with an AUL data in a multiplexing (e.g., piggyback) manner using AUL data resources in the low-frequency band. The normal UCI transmission can be aperiodic or periodic. In some embodiments, the BS may trigger the aperiodic UCI transmission from a different carrier or different frequency band. While the disclosed embodiments are described in the context of pairing a high-frequency band with a low-frequency unlicensed band, the disclosed embodiments can be applied to aggregation of any suitable number (e.g., about 3, 4 or more) of unlicensed or shared frequency bands.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may support link adaptation and hybrid automatic repeat request (HARQ) procedures to improve system performance. Link adaptation refers to the technique where a modulation coding scheme (MCS) and/or an error correction code are selected based on a radio link quality. Parameters that may cause a radio link quality to vary may include interference, path loss, receiver sensitivity, and/or transmitter power headroom. For example, a BS 105 may transmit a reference signal and a UE 115 may determine properties of the channel between the BS 105 and the UE 115 based on measurements obtained from the reference signal. The UE 115 may transmit UCI indicating the channel information to the BS 105 The BS may subsequently schedule and/or allocate resources to the UE 115 based on the UCI.

HARQ is a combination of forward error-correction (FEC) and automatic repeat request (ARQ) error-control. For example, a BS 105 may transmit data encoded with an FEC code to a UE 115. Upon receiving the data, the UE 115 may apply the FEC code to correct a certain number of error bits in the received data. When the FEC is successful in correcting all the error bits, the UE 115 may send an ACK to the BS 105. However, when the FEC is unable to correct all the error bits, the UE 115 may send an NACK to the BS 105 to trigger a retransmission of the data. The BS 105 may retransmit the data encoded using the same coding version or a different coding version (e.g., a different code rate or different parity bits). For example, the BS 105 may adapt the coding version based on the radio link condition. Upon receiving the retransmitted data, the UE 115 may perform soft-combining to decode the data. The retransmission may repeat until the UE 115 receives the data successfully or when a timeout condition is met. A BS 105 may employ multiple parallel HARQ processes to communicate with a UE 115. Each HARQ process may be identified by an HARQ identifier (ID). The BS 105 may associate a data packet with a certain HARQ process by attaching a corresponding HARQ ID to the transmission of the data. The ACK/NACK feedbacks and/or retransmissions for the data packet are unique to the HARQ process. In other words, the parallel HARQ processes are operated independent from each other. For example, a particular HARQ process may be used for a particular type of traffic or transmissions.

A UE 115 may communicate ACK/NACK feedbacks and/or CSI reports in the form of UCI, which may also be referred to as normal UCI. A BS 105 may schedule the UE 115 to transmit the UCI periodically or may trigger the UE 115 to transmit aperiodic UCI. In some embodiments, a BS 105 may communicate with a UE 115 using a self-contained subframe including a DL portion and a UL portion. For example, the BS 105 may transmit a DL communication signal to the UE 115 in a self-contained subframe and may trigger the UE 115 to send UCI after receiving the DL communication signal in the same self-contained subframe. The BS 105 may determine a schedule and/or allocate a resource for the UE 115 for a subsequent communication based on the received UCI. As such, the use of self-contained subframe can provide a fast UCI feedback for link adaptation and/or HARQ processing. In some embodiments, HARQ processing can be applied to UL communications using similar mechanisms, where a UE 115 may transmit a UL data signal to a BS 105 and the BS 105 may send an ACK/NACK feedback in response to the UL data signal.

In an embodiment, the network 100 may operate over multiple aggregated shared frequency bands or an unlicensed frequency bands, for example, at about 3.5 gigahertz (GHz), sub-6 GHz or higher frequencies in the mmWav band. In such an embodiment, the BSs 105 and the UEs 115 may be operated by multiple network operating entities. To avoid collisions, the BSs 105 and the UEs 115 may employ a listen-before-talk (LBT) procedure to reserve transmission opportunities (TXOPs) in the share medium for communications. In some embodiments, a high-frequency band (e.g., a mmWave frequency band) may be paired with a low-frequency band (e.g., a sub-6 GHz band). Channel accesses between different frequency bands are asynchronous. In other words, a BS 105 may gain channel access to the high-frequency band during a certain period of time (e.g., a TXOP), but may not necessarily gain channel access to the low-frequency band during the same period of time. In addition, some UEs 115 may not be able to transmit in the high-frequency bands due to MPE constraints. Mechanisms for communicating normal UCI when operating over multiple aggregated shared frequency bands or unlicensed frequency bands are described in greater detail herein.

Figure 2:
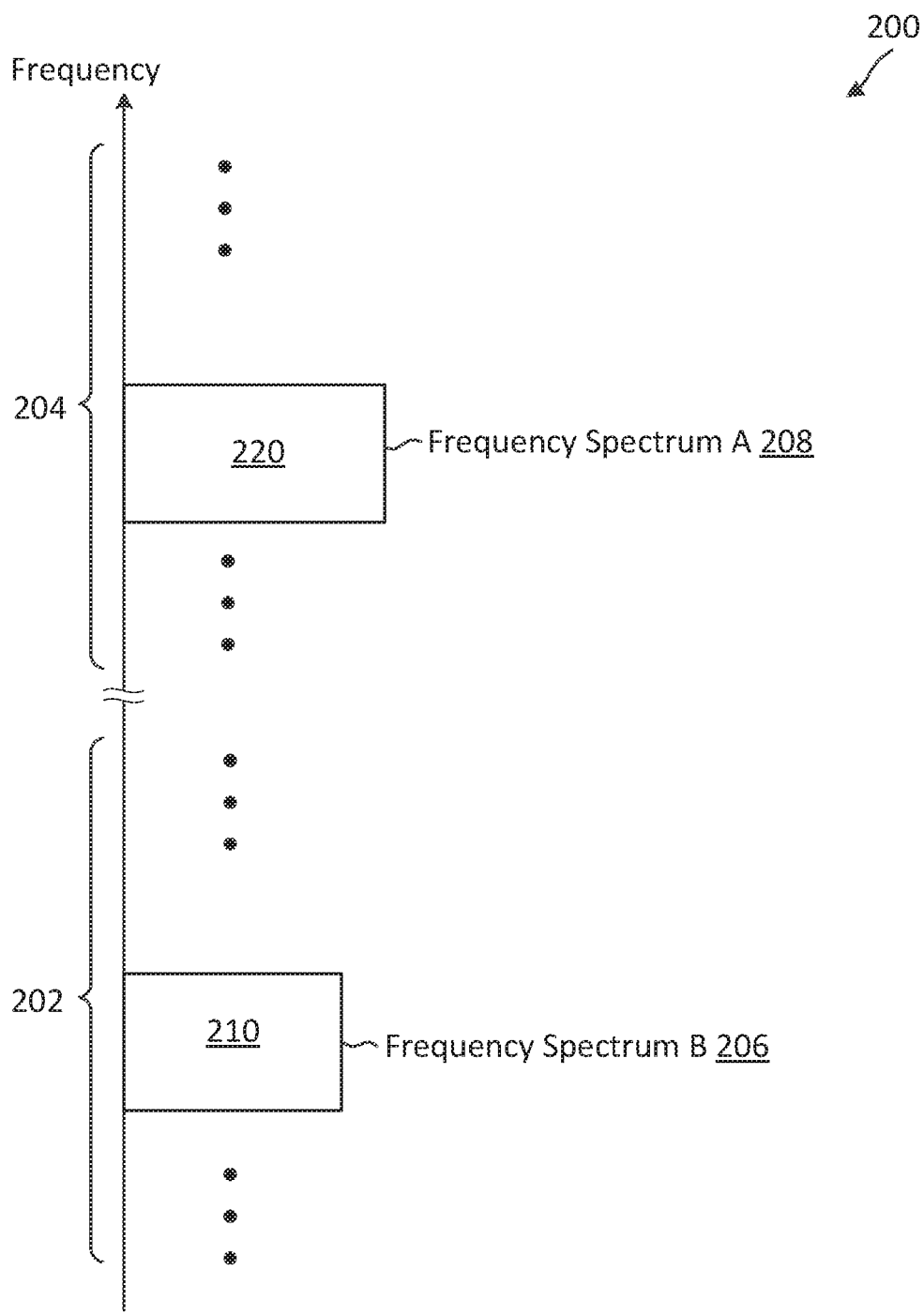
FIG. 2 illustrates a carrier aggregation scenario according to some embodiments of the present disclosure.

FIG. 2 illustrates a carrier aggregation scenario 200 according to some embodiments of the present disclosure. In FIG. 2, the y-axis represents frequency in some constant units. The scenario 200 may correspond to a communication scenario between a BS 105 and a UE 115 in the network 100. The scenario 200 includes a frequency band B 206 and a frequency band A 208. The frequency band A 208 is located in a mmWave frequency range 204, for example, at frequencies above 10 GHz. The frequency band B 206 is located in a low-frequency non-mmWave frequency range 202, for example, at sub-7 GHz frequencies. The channel path or channel response in the frequency band A 208 may significantly differ from the channel path or channel response in the frequency band B 206. For example, the path loss and/or the penetration loss may be higher in frequency band A 208 than in the frequency band B 206 due to the high frequencies.

To overcome the higher path-loss in the frequency band A 208, BSs and UEs may use beamforming to form directional beams for communications. Practical application of beamforming in mmWave systems needs to overcome a number of constraints from regulatory perspectives. For example, Federal Communications Commission (FCC) and International Commission on Non-Ionizing Radiation Protection (ICNIRP) impose MPE constraints on transmitters at various carrier frequencies. The imposing of the MPE constraints can prevent hazardous operating conditions, ensure users' health, and/or reduce electromagnetic pollution or noise from mmWave transmissions. Since UEs are typically close to a user, the UEs may not be allowed to use a high-energy beam due to MPE constraints. Thus, the UE's transmission in the frequency band A 208 may fail. As such, the high-frequency band A 208 may be more suitable for DL communications 220. The UL communications 210 can be in the low-frequency band B 206.

In some embodiments, the frequency band A 208 and the frequency band 206 are shared frequency bands or unlicensed frequency bands. As described above, channel accesses in the different frequency bands are asynchronous. To support link adaptation and/or HARQ processing efficiently, a BS may transmit a DL communication signal in the high-frequency band A 208 and allow a UE to transmit UCI for the DL communication in the low-frequency band B 206 without being scheduled by the BS, as described in greater detail herein.

Figure 3:
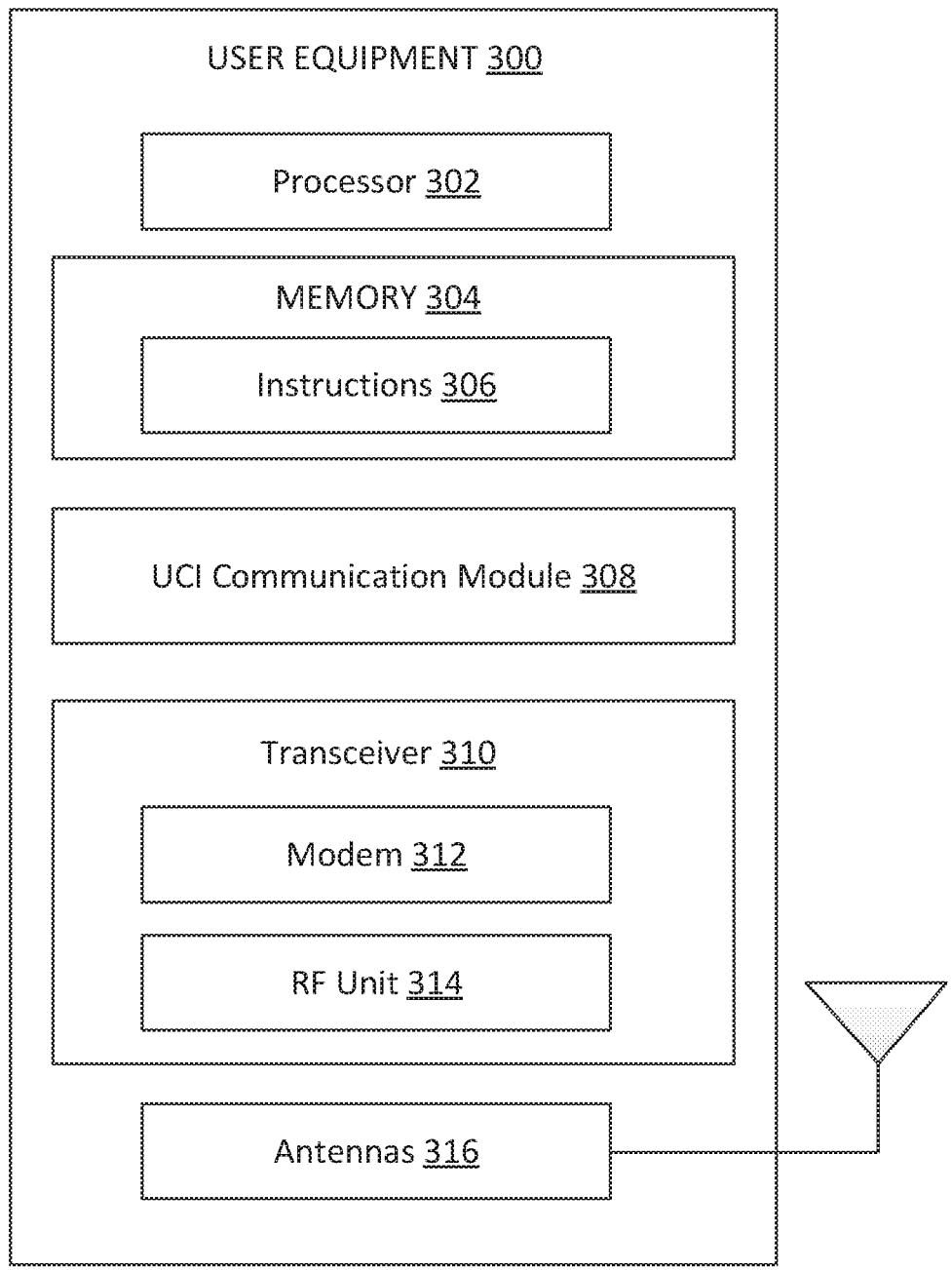
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a UCI communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 5-14. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UCI communication module 308 may be implemented via hardware, software, or combinations thereof. For example, the UCI communication module 308 may be implemented as a processor, circuit, and/or instructions 306 stored in the memory 304 and executed by the processor 302. The UCI communication module 308 may be used for various aspects of the present disclosure. For example, the UCI communication module 308 is configured to receive indications of resources allocated for UCI transmissions and/or UL data transmissions in autonomous mode (e.g., without a scheduling grant), receive DL communication signals (e.g., including reference signals and/or data) and/or UCI triggers from a BS (e.g., the BSs 105), generate UCI (e.g., include CSI reports based on received reference signals or ACK/NACK feedbacks for received data), perform LBT procedures, transmit UCI autonomously as data packets (e.g., transport blocks (TBs)) using the resources allocated for UCI transmissions in autonomous mode based on LBT results, and/or transmit UCI autonomously along with UL data (e.g., via multiplexing or piggybacking) using the resources allocated for AUL data transmissions based on LBT results, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the UCI communication module 308 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
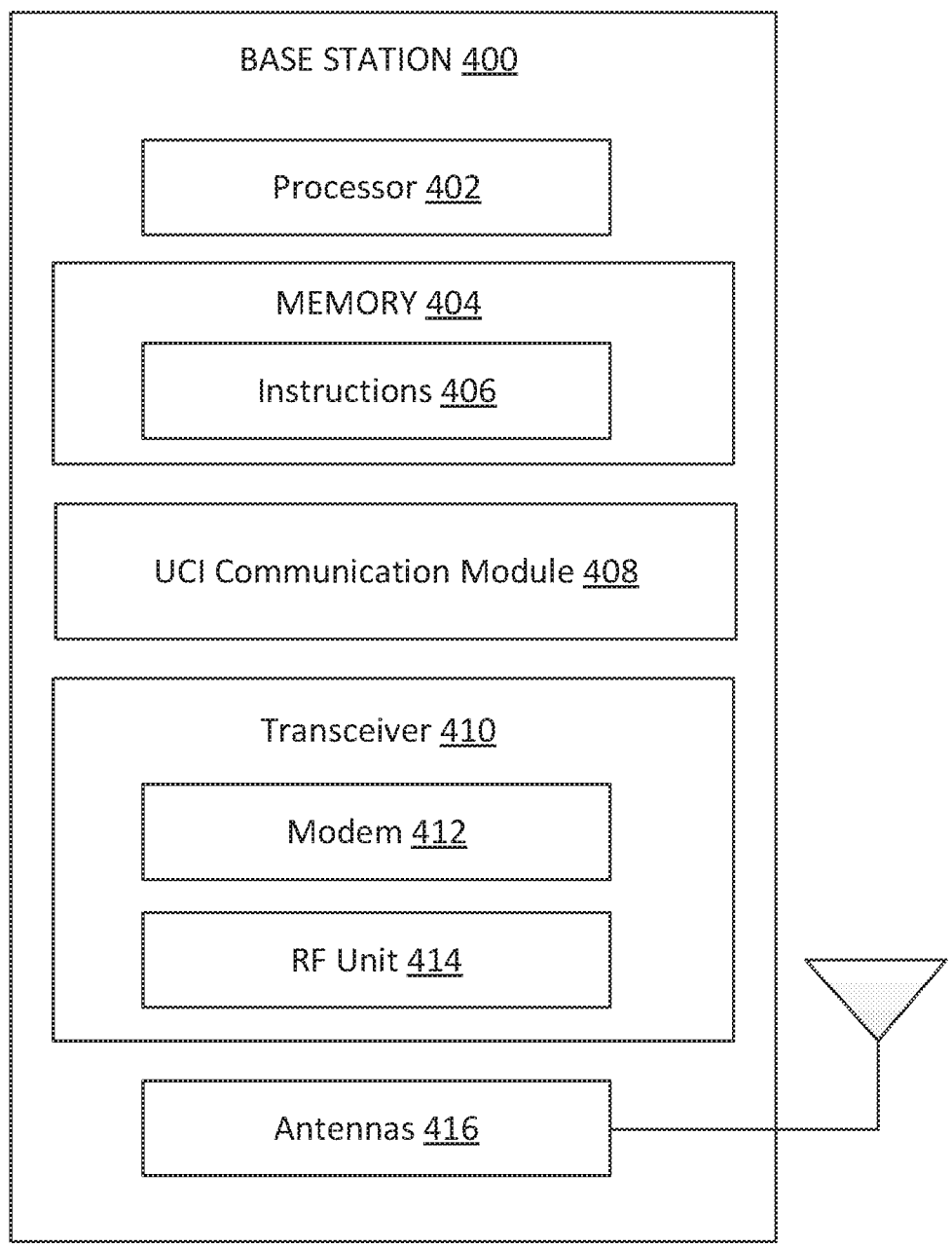
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, a UCI communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-14. Instructions 406 may also be referred to as code, which may be interpreted broadly to include any type of computer-readable statement(s) as discussed above with respect to FIG. 3.

The UCI communication module 408 may be implemented via hardware, software, or combinations thereof. For example, UCI communication module 408 may be implemented as a processor, circuit, and/or instructions 406 stored in the memory 404 and executed by the processor 402. The UCI communication module 408 may be used for various aspects of the present disclosure. For example, the UCI communication module 408 is configured to allocate resources for UL data transmissions and UCI (e.g., CSI reports and/or ACK/NACK reports) transmissions in an autonomous mode, transmit indications of the resources to UEs (e.g., the UEs 115 and 300), perform LBT procedures, transmit DL communication signal (e.g., including reference signals and/or data) and/or UCI triggers to UEs, receive UCIs from UEs, and/or perform link adaptation and/or HARQ processing, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
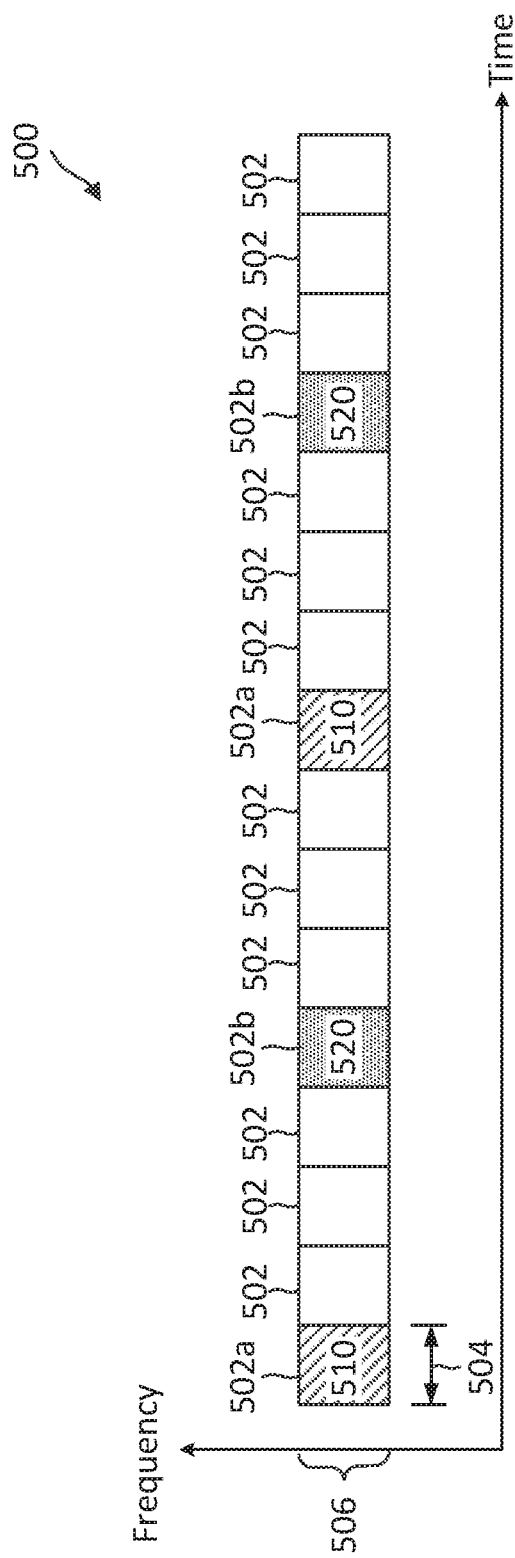
FIG. 5 illustrates a transmission scheme for normal uplink control information (UCI) using autonomous uplink (AUL) data resources according to some embodiments of the present disclosure.
Figure 6:
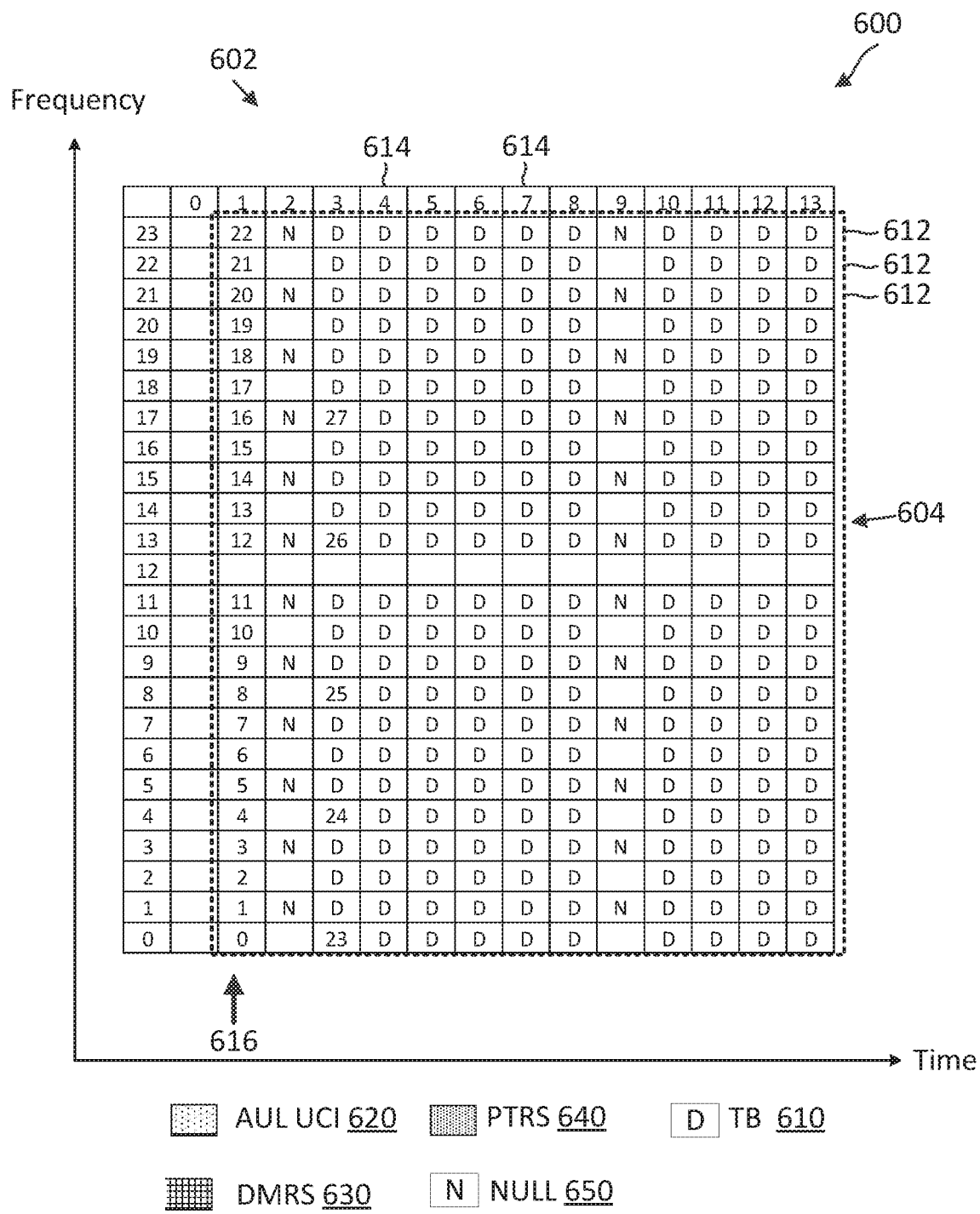
FIG. 6 illustrates an example normal UCI transmission configuration using AUL data resources according to some embodiments of the present disclosure.

As described above, when a network (e.g., the network 100) operates over multiple aggregated unlicensed carriers (e.g., the frequency band A 208 and the frequency band B 206), a BS may not be able to schedule a UE for a normal UCI transmission in a self-contained subframe or in a different frequency band than the frequency band where the BS has gained access. FIGS. 5-6 illustrate various mechanisms for a BS (e.g., the BSs 105) to configure a UE (e.g., the UEs 115) to transmit normal UCI autonomously. In FIGS. 5-6, the x-axes represent time in some constant units.

FIGS. 5-12 illustrate various mechanisms for transmitting normal UCI in an autonomous mode using AUL data resource in a network such as the network 100 operating over multiple aggregated unlicensed carriers as shown in the scenario 200. For example, a BS 105 may transmit a DL communication signal (e.g., the DL communications 220) to a UE 115 in a high-frequency unlicensed band (e.g., the frequency band A 208). In response, the UE 115 may transmit normal UCI (e.g., an ACK/NACK and/or CSI) to the BS in a low-frequency unlicensed band (e.g., the frequency band B 206). In FIGS. 5-12, the x-axes represents time in some constant units, and the y-axes represents frequency in some constant units.

FIG. 5 illustrates a transmission scheme 500 for normal UCI using AUL data resources according to some embodiments of the present disclosure. The scheme 500 may be employed by BSs such as the BSs 105 and UEs such as the UEs 115 in a network such as the network 100. In the scheme 500, normal UCI may be transmitted as a data packet in an AUL subframe or AUL data resource. As shown, the scheme 500 includes a plurality of resources 502 in a frequency band 506. The frequency band 506 may correspond to the low-frequency unlicensed band. Each resource 502 may span a time interval 504 (e.g., including about 14 OFDM symbols) and may correspond to a transmission time interval (TTI) or a transmission slot. In some embodiments, the resources 502 may be in units of RBs. For example, an RB may include about 12 frequency tones in frequency and about 14 OFDM symbols in time.

In the scheme 500, a BS may allocate resources 502 (e.g., 502a and 502b) from the frequency band 506 for AUL data transmissions. A UE may transmit data to the BS using an allocated AUL data resource 502 without receiving a scheduling grant from the BS. The AUL data resources 502 may also be referred to as AUL PUSCH resource. An AUL data transmission may include a TB carrying data information bits encoded by an error control coding scheme or a channel coding scheme, such as an LDPC coding scheme.

To enable autonomous transmissions for normal UCI, the BS may allocate separate AUL data resources 502 for AUL data and for normal UCI. As an example, the BS may assign the AUL data resources 502a for autonomous transmissions of normal UCI 510 and may assign the AUL data resources 502b for autonomous transmissions of AUL data 520. The BS may transmit a configuration of the resources 502a and 502b to the UE. Upon receiving a DL communication signal from the BS, for example, from the high-frequency unlicensed band, the UE may generate a data packet or a TB including normal UCI 510 based on the DL communication signal. The UCI 510 may include an ACK/NACK feedback for DL data in the DL communication signal and/or CSI determined based on a reference signal in the DL communication signal. The UE may perform an LBT procedure in the frequency band 506. When the LBT passes, the UE may transmit the TB carrying the UCI 510 in an AUL data resource 502a based on the configuration without having to wait for a scheduling grant from the BS. As such, the use of autonomous or unscheduled transmissions for normal UCI 510 can increase the chances for normal UCI 510 to be fed back to the BS, and thus may reduce the transmission latency of normal UCI 510.

In an embodiment, the BS may additionally assign different HARQ processes for normal UCI 510 transmissions and for AUL data 520 transmissions. For example, the BS may assign an HARQ process 0 for normal UCI 510 transmissions and an HARQ process 1 for AUL data 520 transmissions. The BS may assign the AUL data resources 502a to the HARQ process 0 and may assign the AUL data resources 502b to the HARQ process 1. The HARQ processes 0 and 1 may operate in parallel. For example, the BS may receive a first data packet (e.g., a HARQ block of HARQ process 1) carrying AUL data 520 from the UE. In response, the BS may send an ACK/NACK feedback for the first data packet on HARQ process 1 to the UE. Similarly, the BS may receive a second data packet (e.g., a HARQ block of HARQ process 0) carrying normal UCI 510 from the UE. In response, the BS may send an ACK/NACK feedback for the second data packet on HARQ process 0 to the UE.

The use of HARQ for normal UCI 510 transmissions enables a UE to determine whether the normal UCI 510 is received correctly by the BS. When the UE receives a NACK from the BS for a UCI 510 transmission, the UE may retransmit the UCI 510 to the BS. Thus, the scheme 500 can improve the transmission reliability for normal UCI. In some embodiments, the UE may transmit a different encoded version (e.g., different parity bits or code rate) of the UCI 510 for the retransmission based on a channel condition. In addition, the scheme 500 may further reduce the transmission latency for normal UCI 510 by increasing the allocation frequency of the AUL data resources 502a.

While the scheme 500 illustrates the multiplexing of AUL data resources 502a and 502b in time, the scheme 500 can be alternatively configured to multiplex AUL data resources for the normal UCI 510 and the AUL data 520 in frequency. For example, the frequency band 506 can be partitioned into frequency interlaces. Each frequency interlace may include a set of interlaced resources spaced apart from each other in the frequency band 506 and frequency-interlaced with another set of interlaced resources of another frequency interlace. The BS may assign one frequency interlace for autonomous transmissions of AUL data 520 (e.g., using HARQ process 1) and another frequency interlace for autonomous transmission of normal UCI 510 (e.g., using HARQ process 0). The use of frequency interlaces can provide several benefits. For example, some unlicensed frequency spectrum may have certain power spectral density (PSD) limitations imposed by regulatory authorities. By allocating interlaced resources that are spread across a wider bandwidth, a transmitter may transmit at a higher power without violating the PSD requirement.

FIG. 6 illustrates an example normal UCI transmission configuration 600 using AUL data resources according to some embodiments of the present disclosure. The configuration 600 may be employed by BSs such as the BSs 105 and UEs such as the UEs 115 in a network such as the network 100. The configuration 600 can be used in conjunction with the scheme 500. The configuration 600 includes an AUL data resource 602 (e.g., the AUL data resources 502a) allocated for an autonomous transmission of the normal UCI 510. As shown, the AUL data resource 602 spans about 24 frequency tones 612 in frequency (e.g., in the frequency band 506) and about 14 OFDM symbols 614 in time. The frequency tones 612 are indexed from 0 to 23. The symbols 614 are indexed from 0 to 13. The AUL data resource 602 may correspond to about 2 RBs.

A UE may transmit an AUL communication signal 604 in the AUL data resource 602 when employing the scheme 500 for normal UCI transmission. The AUL communication signal 604 may include AUL UCI 620, a demodulation reference signal (DMRS) 630, a TB 610, and a phase-tracking reference signal (PTRS) 640. The DMRS 630 can be mapped to the symbols 614 indexed 2 and 9. The DMRS 630 can be interleaved with null symbols 650 in frequency. The PTRS 640 can be mapped to the frequency tone 612 indexed 12 across the symbols 614 indexed 1 to 13 and excluding the frequency tones 612 occupied by the DMRS 630. The AUL UCI 620 begins at the symbol 614 indexed 1, skipping the symbol 614 indexed 2 occupied by the DMRS 630, and continues to the symbol 614 indexed 3 depending on the length of the AUL UCI 620. For example, the AUL UCI 620 may occupy about 28 frequency tones 612 indexed 0 to 27. The TB 610 begins at the symbol 614 indexed 3 excluding frequency tones 612 occupied by the AUL UCI 620.

The TB 610 includes the normal UCI 510, which is treated as information data bits in a data packet. For example, the UE may generate a cyclic-redundancy-check (CRC) based on the normal UCI 510 and may attach the CRC to the normal UCI 510. The UE may apply code block segmentation, error control or channel coding (e.g., an LPDC scheme), rate matching, and/or code block concatenation to the normal UCI 510 with the attached CRC to produce the TB 610.

The AUL UCI 620 includes a transmission configuration for the AUL communication signal 604. The transmission configuration can indicate a starting symbol 616 (e.g., the symbol 616 indexed 1) of the AUL communication signal 604, an MCS used for transmitting the TB 610, and/or any information related to the transmission of the AUL communication signal 604 so that a BS can decode the normal UCI 510 from the TB 610 upon reception. The DMRS 630 may include pilot symbols interleaving with null symbols to enable the BS to perform channel estimation and demodulation for the decoding. While the TB 610 is shown to span up to the symbol 614 indexed 13, the TB 610 can end at an earlier symbol 614 depending on the size of the normal UCI 510.

Figure 7:
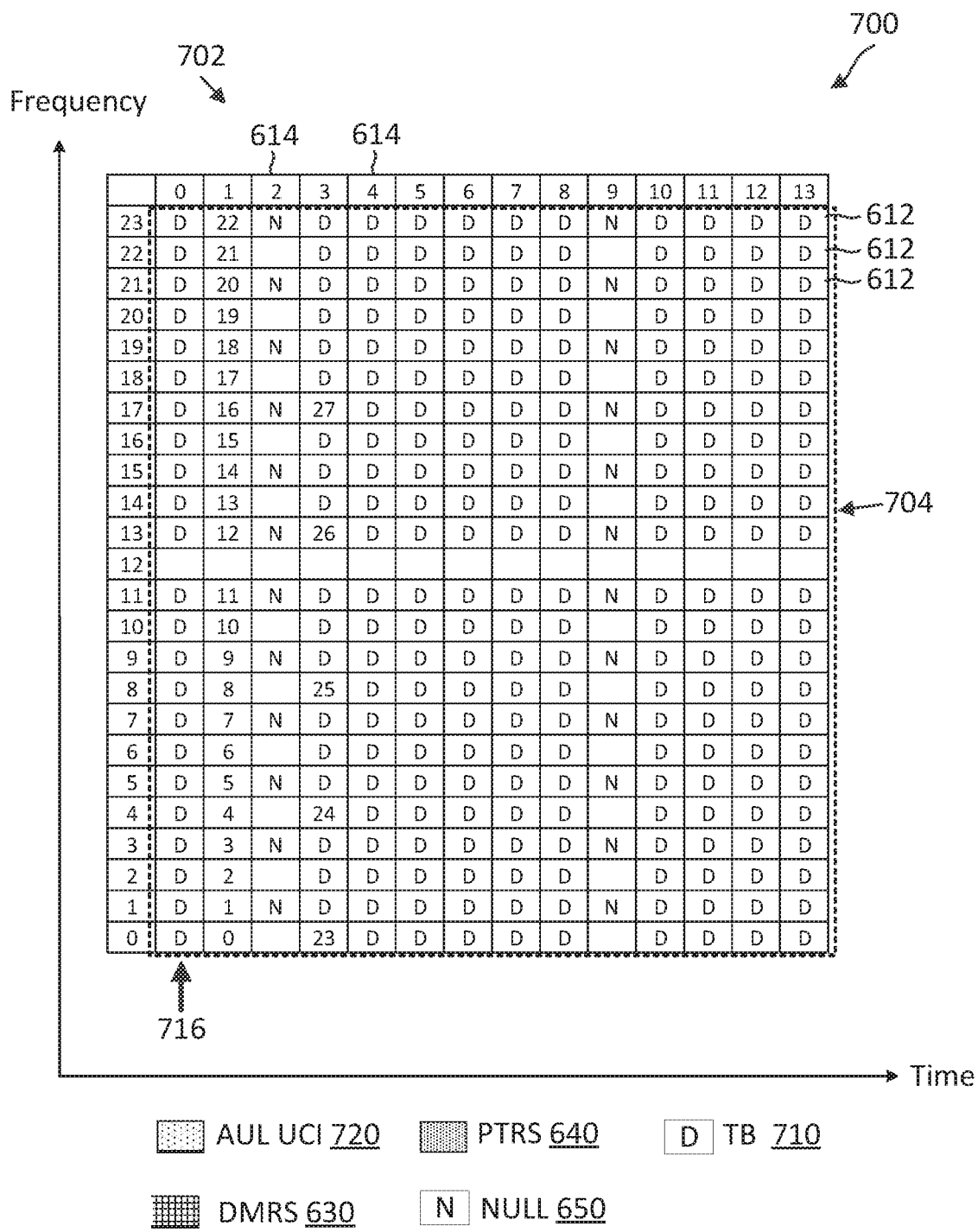
FIG. 7 illustrates an example normal UCI transmission configuration using AUL data resources according to some embodiments of the present disclosure.

FIG. 7 illustrates an example normal UCI transmission configuration 700 using AUL data resources according to some embodiments of the present disclosure. The configuration 700 may be employed by BSs such as the BSs 105 and UEs such as the UEs 115 in a network such as the network 100. The configuration 700 can be used in conjunction with the scheme 500. The configuration 700 is similar to the configuration 600, but illustrates an example of AUL data transmission starting at the symbol 614 indexed 0 (e.g., the starting symbol 716). Similar to the configuration 600, a UE may transmit an AUL communication signal 704 including AUL UCI 720 (e.g., the AUL UCI 620), a DMRS 630, a PTRS 640, and a TB 710 (e.g., the TB 610) carrying the normal UCI 510 as information data bits. However, the TB 710 begins at the symbol 614 indexed 0 instead of indexed 1 as in the configuration 600.

Figure 8:
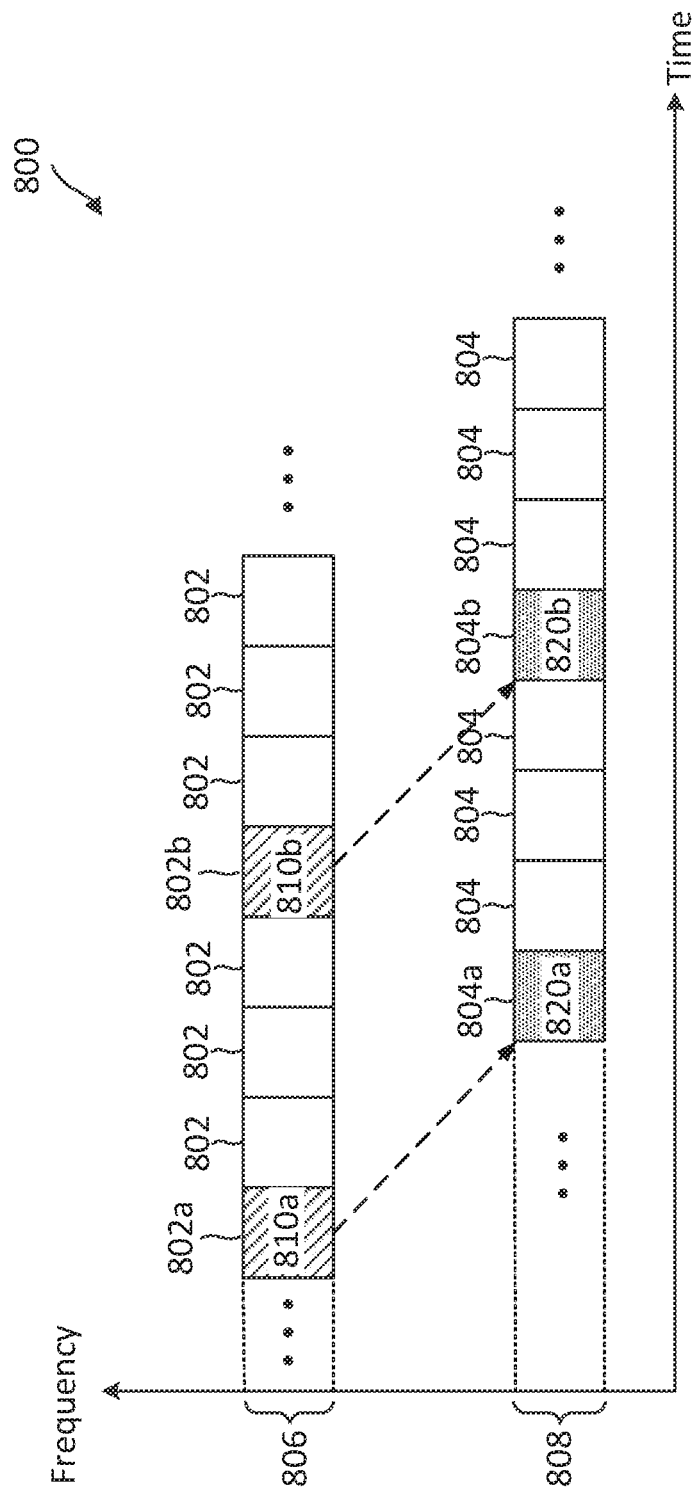
FIG. 8 illustrates a transmission scheme for normal UCI using AUL data resources according to some embodiments of the present disclosure.

FIG. 8 illustrates a transmission scheme 800 for normal UCI using AUL data resources according to some embodiments of the present disclosure. The scheme 800 may be employed by BSs such as the BSs 105 and UEs such as the UEs 115 in a network such as the network 100. In the scheme 800, normal UCI may be transmitted along with AUL data in an AUL subframe or AUL data resource. As shown, the scheme 800 includes a plurality of resources 802 in a frequency band 806 and a plurality of resources 804 in the frequency band 808. The frequency band 806 may correspond to the high-frequency unlicensed band and the frequency band 808 may correspond to the low-frequency unlicensed band. The resources 802 and 804 may be substantially similar to the resources 502 and 602.

In the scheme 800, a BS may allocate resources 804 (e.g., 804a and 804b) from the frequency band 808 for AUL data transmissions. A UE may transmit normal UCI (e.g., the normal UCI 510) along with AUL data (e.g., the AUL data 520) using an allocated AUL data resource 804. As an example, the BS may assign the AUL data resources 804a and 804b for autonomous AUL data transmissions. The BS may transmit a configuration of the resources 804a and 804b to the UE. The BS may transmit a DL communication signal 810a to the UE in the frequency band 806 using the resource 802a. The DL communication signal 810a can include DL data and/or a reference signal. The BS can include a trigger in the DL communication signal 810a to request for normal UCI (e.g., an ACK/NACK feedback for the DL data and/or CSI based on the reference signal) from the UE.

Upon receiving the DL communication signal 810a including the trigger from the BS, the UE may generate a data packet including AUL data (e.g., the AUL data 820) along with normal UCI (e.g., the normal UCI 510) based on the DL communication signal 810a. The UE may perform an LBT procedure in the frequency band 808. When the LBT passes, the UE may transmit an AUL data signal 820a including the AUL data and the normal UCI in the frequency band 808 using an AUL data resource 804a. The UE may transmit the AUL data signal 820a based on the trigger without receiving a specific scheduling grant from the BS for the frequency band 808.

The trigger is an aperiodic trigger based on the BS. For example, the BS may subsequently transmit another DL communication signal 810b in the frequency band 806 using the resource 802b. Similarly, the DL communication signal 810b may include a normal UCI trigger. The UE may respond by transmitting an AUL data signal 820b including AUL data along with normal UCI for the DL communication signal 810b based on the trigger in the frequency band 808 using the resource 804b.

While the scheme 800 is described in the context of aperiodic normal UCI, in some embodiments, the BS may configure a UE to transmit normal UCI based on a predetermined periodicity. Thus, the UE may transmit normal UCI along with the AUL data using AUL data resources (e.g., the AUL data resources 804a and 804b) based on the predetermined periodicity and LBT results.

Figure 9:
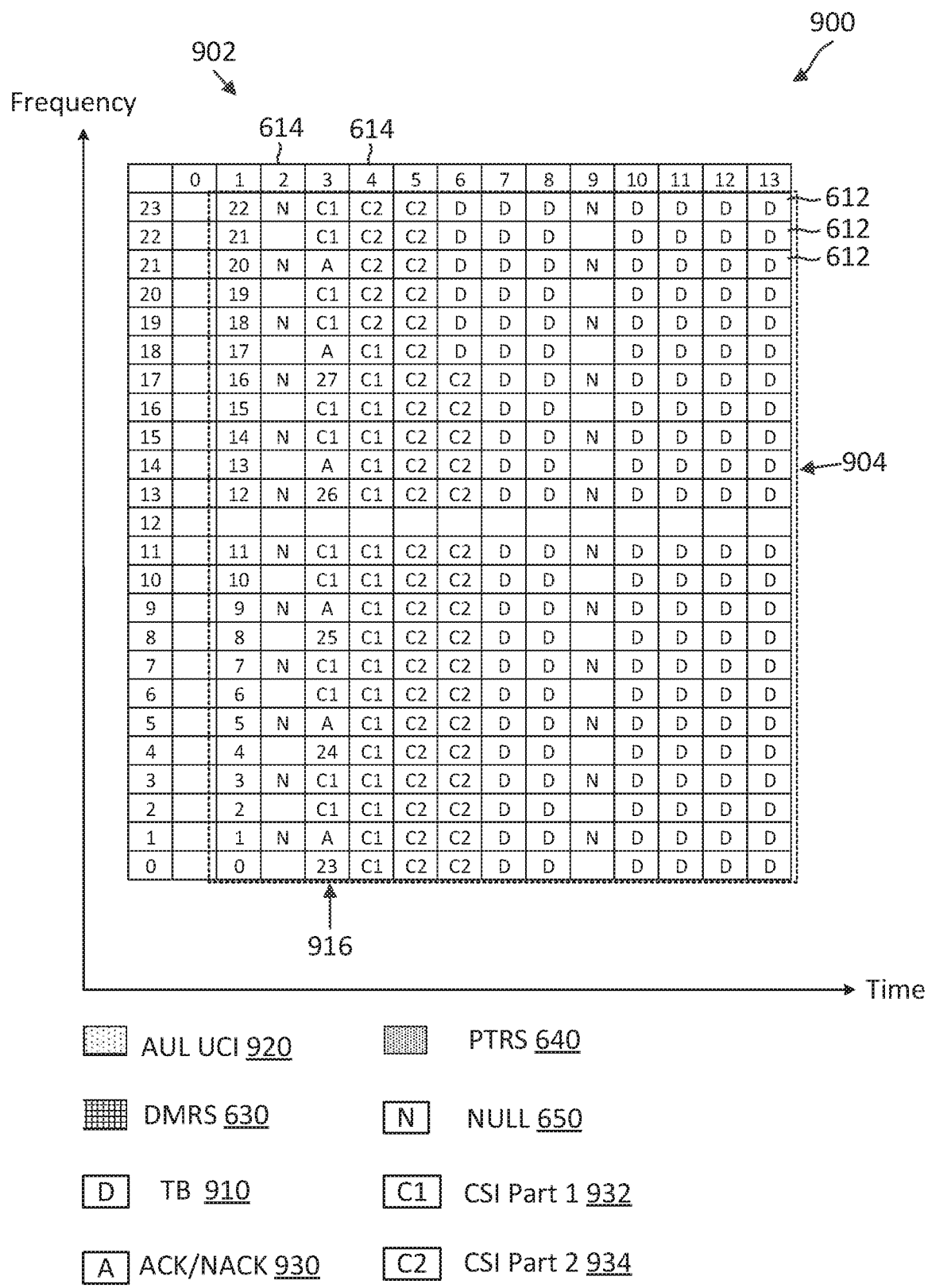
FIG. 9 illustrates an example normal UCI transmission configuration using AUL data resources according to some embodiments of the present disclosure.

FIG. 9 illustrates an example normal UCI transmission configuration 900 using AUL data resources according to some embodiments of the present disclosure. The configuration 900 may be employed by BSs such as the BSs 105 and UEs such as the UEs 115 in a network such as the network 100. The configuration 900 can be used in conjunction with the scheme 800. The configuration 900 includes an AUL data resource 902 (e.g., the AUL data resources 804a and 804b) allocated for an autonomous transmission of the normal UCI (e.g., the normal UCI 510) along with the AUL data (e.g., the AUL data 520) in a multiplexing or piggyback arrangement. The configuration 900 is described using a similar resource configuration as in the configurations 600 and 700. For example, the AUL data resource 902 span about 24 frequency tones 612 in frequency, for example, in the frequency band 808, and about 13 OFDM symbols 614 in time.

A UE may transmit an AUL communication signal 904 in the AUL data resource 902 when employing the scheme 800 for normal UCI transmission. The AUL communication signal 904 includes AUL UCI 920, a DMRS 630, a PTRS 640, normal UCI including an ACK/NACK feedback 930, a CSI part 1 932, and a CSI part 2 934, and a TB 910 carrying AUL data (e.g., the AUL data 520). The DMRS 630 and the PTRS 640 are mapped onto the AUL data resource 902 using the same mapping configuration as in the configurations 600 and 700. The AUL UCI 920 is mapped onto the AUL data resource 902 using the same mapping configuration as the AUL UCI 620 in the configurations 600 and 700. The AUL UCI 920 can include a transmission configuration indicating whether the AUL communication signal 904 includes normal UCI, a starting symbol index 916 (e.g., the symbol 614 indexed 3) of the normal UCI, a MCS of the AUL data 520, and/or any information related to the transmission of the AUL communication signal 904.

The ACK/NACK feedback 930 is mapped to the symbol 614 indexed 3 after the DMRS 630, for example, similar to the ACK/NACK mapping in NR. The ACK/NACK feedback 930 can be rate-matched around the frequency tones 612 occupied by the AUL UCI 920. The ACK/NACK feedback 930 can be distributed or spaced apart in frequency to provide better performance. The CSI part 1 932 can be mapped to remaining frequency tones 612 in the symbol 614 indexed 3 after the ACK/NACK feedback 930 is mapped and continued to subsequent symbol 614 indexed 4. The CSI part 2 934 can be mapped to remaining frequency tones 612 in the symbol 614 indexed 4 after the CSI part 1 932 is mapped and continued to subsequent symbols 614 indexed 5 and 6. The TB 910 carrying the AUL data can be mapped to remaining frequency tones 612 and symbols 614 in the AUL data resource 902. For example, the ACK/NACK feedback 930 may occupy about 6 frequency tones 612, the CSI part 1 932 may occupy about 28 frequency tones 612, and the CSI part 2 934 may occupy about 48 frequency tones 612.

In an embodiment, the ACK/NACK feedback 930 may be a HARQ ACK/NACK for DL data in a DL communication (e.g., the DL communication signal 810). The CSI part 1 932 and the CSI part 2 934 can include information related to CSI-RS resource indicator (CRT), rank indicator (RI), layer indicator (LI), wideband channel quality indicator (CQI), and/or subband differential CQI, and/or precoding matrix indicator (PMI), determined based on a reference signal (e.g., a CSI-RS) in a DL communication.

In an embodiment, a UE may generate a CRC based on the AUL data, attach the CRC to the AUL data, apply code block segmentation, error control or channel coding (e.g., an LPDC scheme), rate matching, and/or code block concatenation the CRC-attached AUL data to produce the TB 910. The UE may apply code block segmentation and/or channel coding (e.g., a polar code) to the normal UCI before multiplexing the normal UCI with the TB 910.

Figure 10:
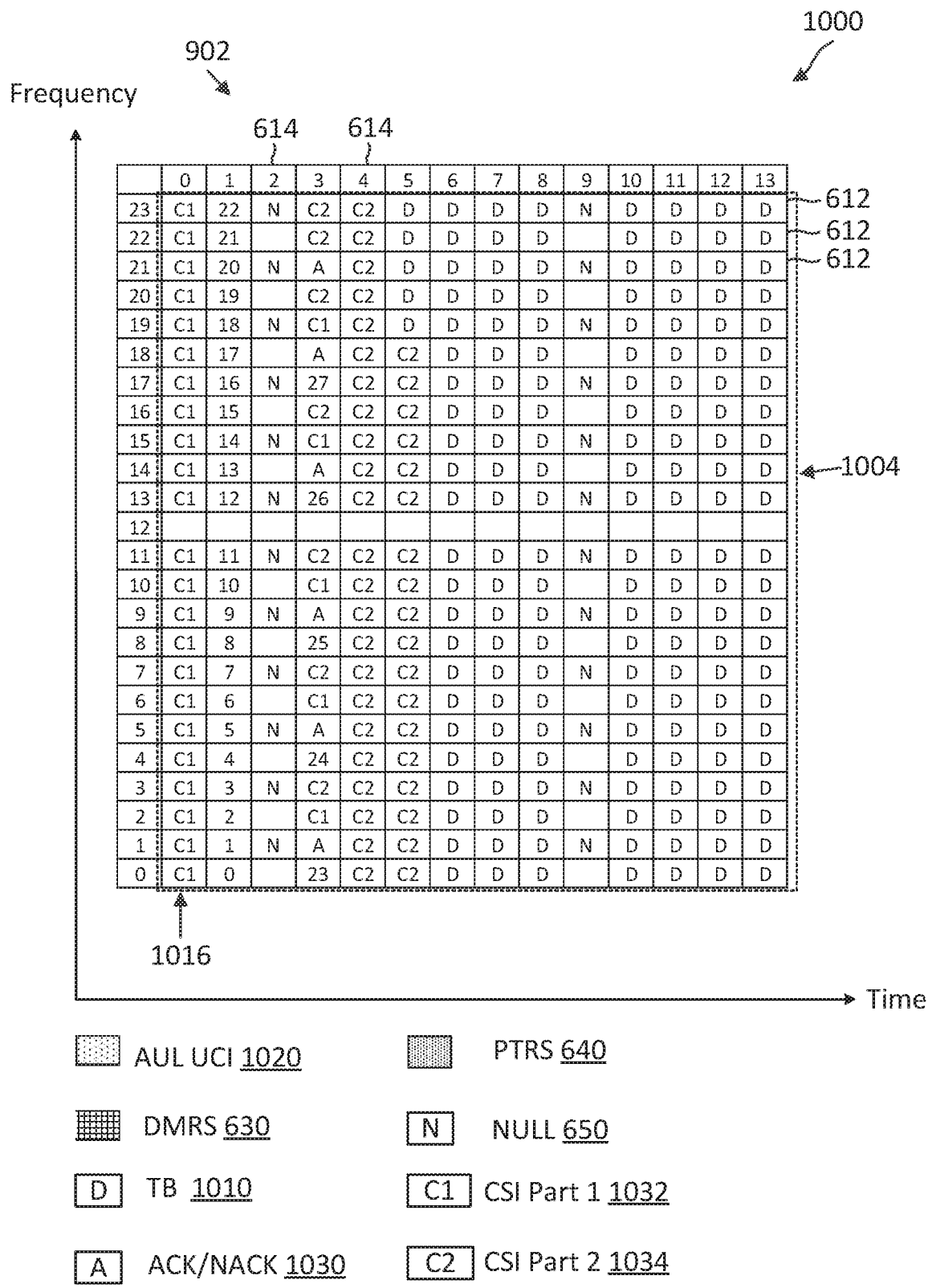
FIG. 10 illustrates an example normal UCI transmission configuration using AUL data resources according to some embodiments of the present disclosure.

FIG. 10 illustrates an example normal UCI transmission configuration 1000 using AUL data resources according to some embodiments of the present disclosure. The configuration 1000 may be employed by BSs such as the BSs 105 and UEs such as the UEs 115 in a network such as the network 100. The configuration 1000 can be used in conjunction with the scheme 800. The configuration 1000 is similar to the configuration 900, but illustrates an example of AUL data transmission starting at the symbol 614 indexed 0. Similar to the configuration 900, a UE may transmit an AUL communication signal 1004 using an AUL data resource 902. The AUL communication signal 1004 may include AUL UCI 1020 (e.g., the AUL UCI 920), a DMRS 630, a PTRS 640, normal UCI including an ACK/NACK feedback 1030 (e.g., the ACK/NACK feedback 930), a CSI part 1 1032 (e.g., the CSI part 1 932), and a CSI part 2 1034 (e.g., CSI part 2 934), and a TB 1010 carrying AUL data (e.g., the AUL data 520). However, the normal UCI 510 begins at the symbol 614 indexed 0 (e.g., a starting symbol index 1016) instead of indexed 1 as in the configuration 900. The ACK/NACK feedback 1030 is mapped onto the AUL data resource 904 using the same mapping configuration as in the configuration 900. However, the CSI part 1 1032 begins at the symbol 614 indexed 0 and continue to symbol 614 indexed 3 after the ACK/NACK feedback 930 is mapped.

Figure 11:
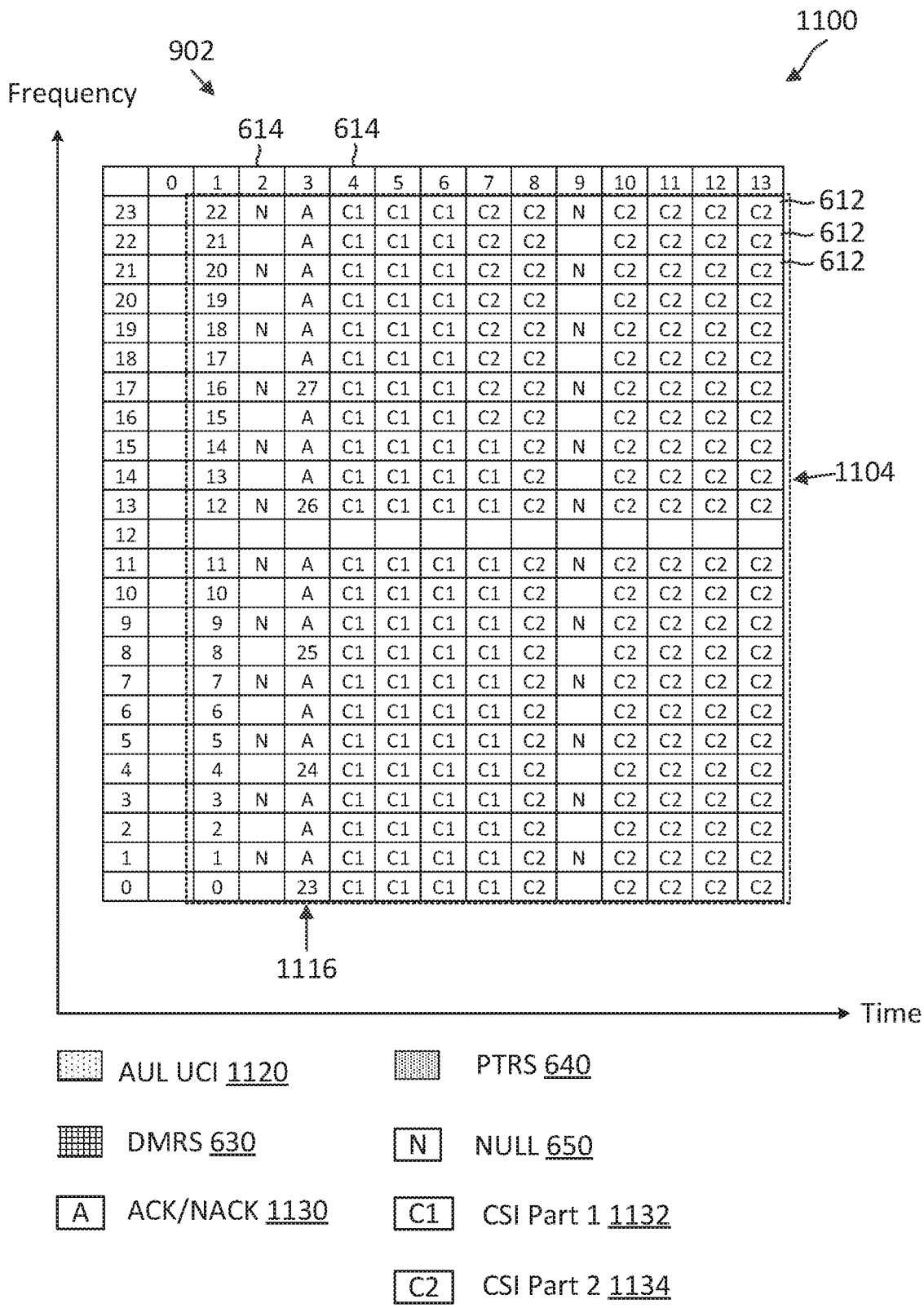
FIG. 11 illustrates an example normal UCI transmission configuration using AUL data resources according to some embodiments of the present disclosure.

FIG. 11 illustrates an example normal UCI transmission configuration 1100 using AUL data resources according to some embodiments of the present disclosure. The configuration 1100 may be employed by BSs such as the BSs 105 and UEs such as the UEs 115 in a network such as the network 100. The configuration 1100 can be used in conjunction with the scheme 800. The configuration 1100 is similar to the configuration 900, but illustrates an example of AUL transmission without any AUL data. For example, a UE may transmit an AUL communication signal 1104 including AUL UCI 1120 (e.g., the AUL UCI 920 and 1020), a DMRS 630, a PTRS 640, normal UCI including an ACK/NACK feedback 1130 (e.g., the ACK/NACK feedbacks 930 and 1030), a CSI part 1 1132 (e.g., the CSI part 1 932 and 1032), and a CSI part 2 1134 (e.g., CSI part 2 934). The AUL communication signal 1104 begins at a starting symbol 614 indexed 1. The normal UCI begins at the symbol 614 indexed 3 (e.g., a starting symbol 1116). The normal UCI in the configuration 1100 can occupy more frequency tones 612 than in the configuration 900. For example, the ACK/NACK feedback 1130 may occupy about 18 frequency tones 612, the CSI part 1 1132 may occupy about 84 frequency tones 612, and the CSI part 2 1134 may occupy about 122 frequency tones 612.

Figure 12:
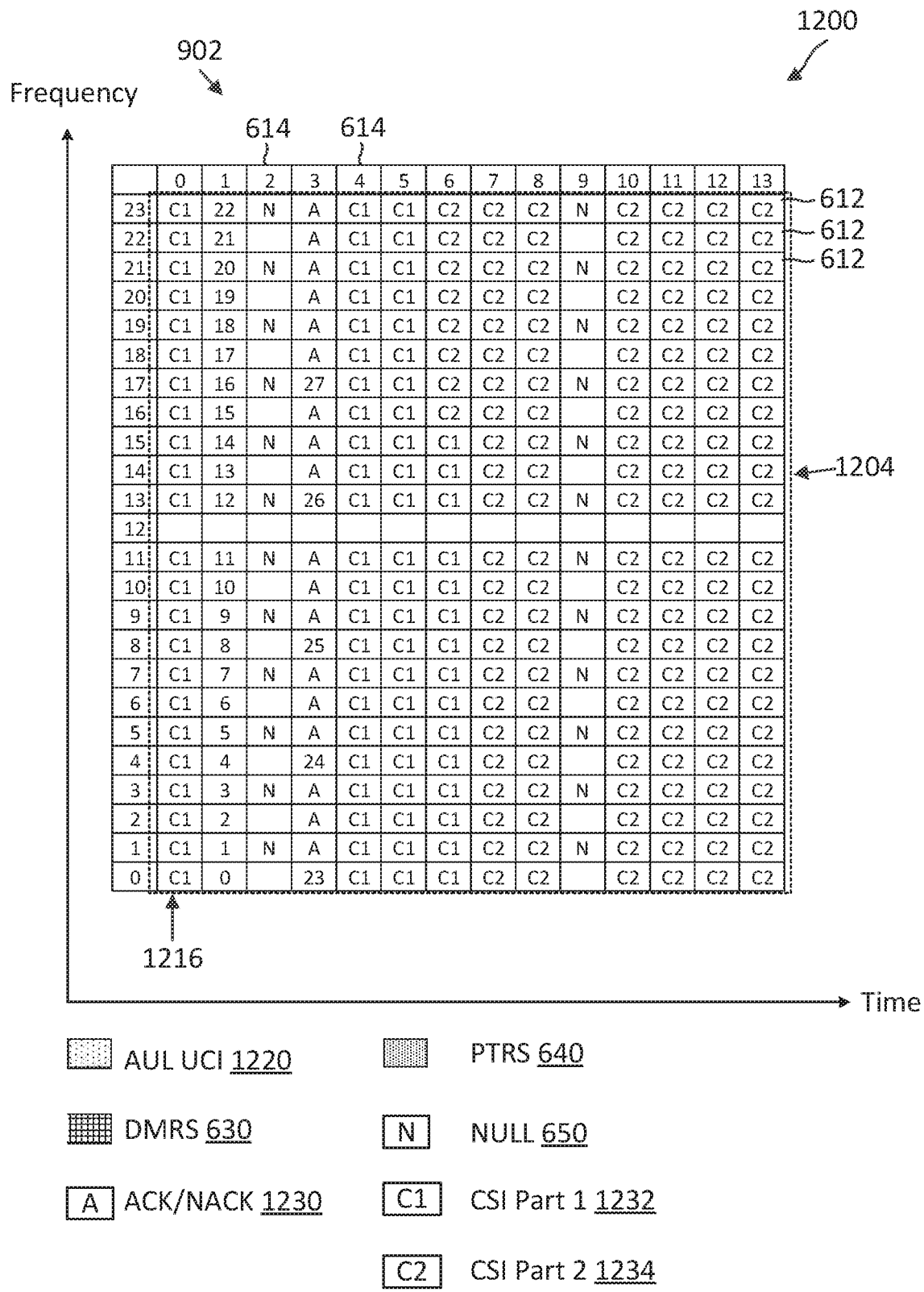
FIG. 12 illustrates an example normal UCI transmission configuration using AUL data resources according to some embodiments of the present disclosure.

FIG. 12 illustrates an example normal UCI transmission configuration 1200 using AUL data resources according to some embodiments of the present disclosure. The configuration 1200 may be employed by BSs such as the BSs 105 and UEs such as the UEs 115 in a network such as the network 100. The configuration 1200 can be used in conjunction with the scheme 800. The configuration 1200 is similar to the configuration 1000, but illustrates an example of AUL transmission without any AUL data 520. For example, a UE may transmit an AUL communication signal 1204 including AUL UCI 1220 (e.g., the AUL UCI 920 and 1020), a DMRS 630, a PTRS 640, normal UCI including an ACK/NACK feedback 1230 (e.g., the ACK/NACK feedbacks 930, 1030, and 1130), a CSI part 1 1232 (e.g., the CSI part 1 932, 1032, and 1132), and a CSI part 2 1234 (e.g., CSI part 2 934, 1034, and 1134). The AUL communication signal 1204 begins at the symbol 614 indexed 0. The normal UCI begins at the symbol 614 indexed 0 (e.g., a starting symbol 1216). The normal UCI in the configuration 1200 can occupy more frequency tones 612 than in the configuration 1000.

Figure 13:
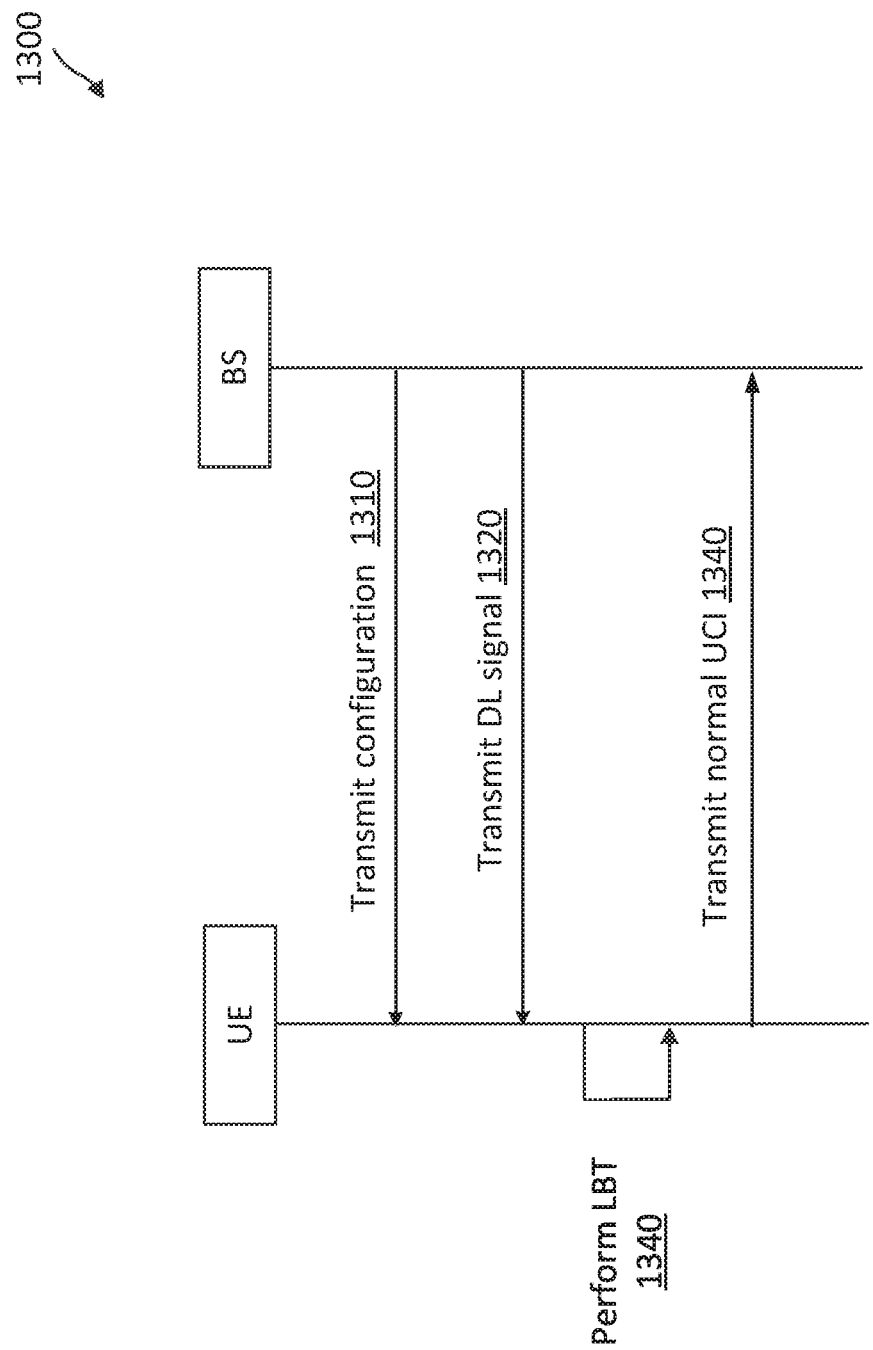
FIG. 13 is a signaling diagram of a UCI communication method according to some embodiments of the present disclosure.

FIG. 13 is a signaling diagram of a normal UCI communication method 1300 according to some embodiments of the present disclosure. The method 1300 is implemented by a BS (e.g., the BSs 105 and 400) and a UE (e.g., the UEs 115 and 300) in a network (e.g., the network 100). Steps of the method 1300 can be executed by computing devices (e.g., a processor, processing circuit, and/or other suitable component) of the BS and the UE. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the BS transmits an AUL resource configuration to the UE. In one embodiment, the configuration can indicate resources (e.g., the AUL data resources 502a and 602) allocated for autonomous transmissions (e.g., unscheduled transmissions) of normal UCI (e.g., the normal UCI 510, the ACK/NACK feedbacks 930, 1030, 1130, and 1230, the CSI part 1 932, 1032, 1132, and 1232, and the CSI part 2 934, 1034, 1134, and 1234). The configuration can further indicate an HARQ processes assigned for transmitting unscheduled normal UCI. In another embodiment, the configuration can indicate resources (e.g., the AUL data resources 804a and 804b) allocated for autonomous transmissions (e.g., unscheduled transmissions) of AUL data (e.g., the AUL data 520).

At step 1320, the BS transmits a DL communication signal to the UE. The DL communication signal can includes DL data (e.g., a TB) and one or more reference signals (e.g., the DMRS 630, the PTRS 640, and/or a CSI-RSs).

At step 1330, upon receiving the DL communication signal, the UE may perform an LBT.

At step 1340, when the LBT passes, the UE transmits normal UCI to the BS based on the DL communication signal. The normal UCI can include an ACK/NACK feedback (e.g., the ACK/NACK feedback 930, 1030, 1130, and 1230) for the DL data and/or CSI (e.g., the CSI part 1 932, 1032, 1132, and 1232 and the CSI part 2 934, 1034, 1134, and 1234) determined based on the reference signals.

In an embodiment, the DL communication signal can be transmitted in a high-frequency unlicensed band (e.g., the frequency band A 208 and the frequency band 806). The UE may transmit an AUL communication signal including the normal UCI in a low-frequency unlicensed band (e.g., the frequency band B 206 and the frequency band 506 and 808). The AUL communication signal can be similar to the AUL communication signals 604 and 704, where the normal UCI is transmitted as a data TB, or similar to the AUL communication signals 904, 1004, 1104, and 1204, where the normal UCI is multiplexed along with AUL data depending on the received configuration. In some embodiments, the normal UCI can include ACK/NACK feedbacks and/or CSI for DL communication signals received in the low-frequency unlicensed band.

Figure 14:
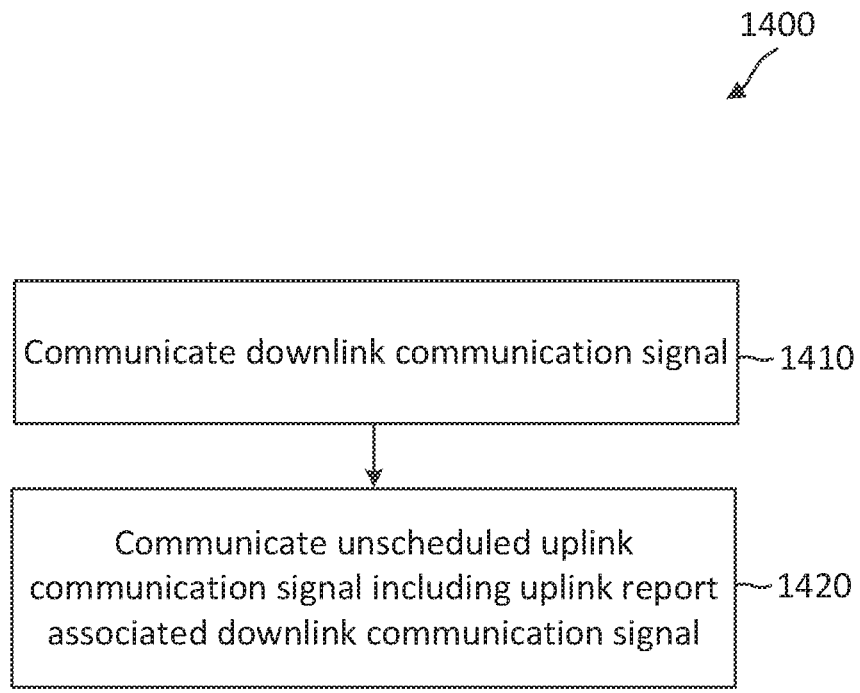
FIG. 14 is a flow diagram of a UCI communication method according to embodiments of the present disclosure.

FIG. 14 is a flow diagram of a normal UCI communication method 1400 according to embodiments of the present disclosure. Steps of the method 1400 can be executed by a computing device (e.g., a processor, processing circuit, and/or other suitable component) of a wireless communication device or other suitable means for performing the steps.

For example, a wireless communication device, such as the BS 105 or the BS 400, may utilize one or more components, such as the processor 402, the memory 404, the UCI communication module 408, the transceiver 410, the modem 412, and the one or more antennas 416, to execute the steps of method 1400. In another example, a wireless communication device, such as the UE 105 or the UE 300, may utilize one or more components, such as the processor 302, the memory 304, the UCI communication module 308, the transceiver 310, the modem 312, and the one or more antennas 316, to execute the steps of method 1400. The method 1400 may employ similar mechanisms as in the schemes 500 and 800 and the configurations 600, 700, 900, 1000, 1100, 1200, and/or the method 1300 described with respect to FIGS. 5, 8, 6, 7, 9, 10, 10, 11, 12, and/or 13, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device, a DL communication signal (e.g., the DL communications 220 and the DL communication signal 810.

At step 1420, the method 1400 includes communicating, by the first wireless communication device with the second wireless communication device, an unscheduled UL communication signal (e.g., the AUL communication signals 604, 704, 904, 1004, 1104, and 1204) including an uplink report (e.g., the normal UCI 510) associated with the DL communication signal based on an LBT procedure. The DL communication signal can be communicated in a first frequency band (e.g., the frequency band 806 or a mmWave band) and the unscheduled UL communication signal can be communicated in a second, different frequency band (e.g., the frequency band 506 or 808 or a sub-6 GHz band). Alternatively, the DL communication signal and the unscheduled UL communication signal can be communicated in the same frequency band (e.g., the frequency band 506 or 808 or a sub-6 GHz band).

In one embodiment, the first wireless communication device may correspond to a BS and the second wireless communication device may correspond to a UE. The communicating the DL communication signal includes transmitting, by the first wireless communication device to the second wireless communication device, the DL communication signal. The communicating the unscheduled UL communication signal includes receiving, by the first wireless communication device from the second wireless communication device, the unscheduled UL communication signal.

In another embodiment, the first wireless communication device may correspond to a UE and the second wireless communication device may correspond to a BS. The communicating the DL communication signal includes receiving, by the first wireless communication device from the second wireless communication device, the DL communication signal. The communicating the unscheduled UL communication signal includes transmitting, by the first wireless communication device to the second wireless communication device, the unscheduled UL communication signal.

In an embodiment, the uplink report can include at least one of an ACK/NACK (e.g., the ACK/NACK feedbacks 930, 1030, 1103, and 1230) for data in the DL communication signal or CSI (e.g., the CSI part 1 932, 1032, 1132, and 1232 and the CSI part 2 934, 1034, 1134, and 1234) determined based on the DL communication signal.

In an embodiment, the unscheduled uplink communication signal can be communicated using a resource (e.g., the AUL data resource 502*a*, 602, 804*a*, 804*b*, 902) allocated for an unscheduled uplink data transmission. The unscheduled uplink communication signal can include a TB (e.g., the TB 610) including the uplink report represented by information data bits. In an embodiment, the first wireless communication device can communicate an ACK/NACK feedback for the TB including the uplink report based on an HARQ process (e.g., the HARQ process 0 in the scheme 500 described with respect to FIG. 5) designated for an unscheduled UL report transmission.

In an embodiment, the unscheduled uplink communication signal can further include a transmission configuration used for communicating the unscheduled uplink communication signal, the transmission configuration including at least one of a starting symbol index (e.g., the starting symbols 916, 1016, 1116, and 1216) for the uplink report or an indication of an inclusion of the uplink report in the unscheduled uplink communication signal. In an embodiment, the first wireless communication device can further rate-match the uplink report based on a frequency tone mapping of the transmission configuration, for example, to rate-match around AUL UCI (e.g., the AUL UCIs 620 and 720) in the unscheduled UL communication signal.

In an embodiment, the unscheduled UL communication signal can further include a TB (e.g., the TBs 910 and 1010) carrying AUL data (e.g., the AUL data 520) multiplexed with the UL report, for example, as shown in the configurations 900 and 1000.

In an embodiment, the UL report is communicated further based on a predetermined periodicity. In an embodiment, communicating, by the first wireless communication device with the second wireless communication device, an UL report request (e.g., a trigger) in a first frequency band (e.g., the frequency band 806). The uplink report in the unscheduled UL communication signal can be communicated in response to the UL report request. The unscheduled UL communication signal can be communicated in a second frequency band. The first and second frequency bands can be different. Alternatively, the first and second frequency bands can be the same.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a downlink communication signal; and communicating, by the first wireless communication device with the second wireless communication device, an unscheduled uplink communication signal including an uplink report associated with the downlink communication signal, the unscheduled uplink communication signal communicated based on a listen-before-talk (LBT) procedure.

In some embodiments, wherein the uplink report includes at least one of an acknowledgement (ACK) for data in the downlink communication signal, a negative-acknowledgement (NACK) for the data in the downlink communication signal, or channel information based at least on the downlink communication signal. In some embodiments, wherein the communicating the unscheduled uplink communication signal includes communicating, by the first wireless communication device with the second wireless communication device, the unscheduled uplink communication signal using a resource allocated for an unscheduled uplink data transmission. In some embodiments, wherein the unscheduled uplink communication signal includes a transport block including the uplink report. In some embodiments, the method further comprises communicating, by the first wireless communication device with the second wireless communication device, an acknowledgement/negative-acknowledgement (ACK/NACK) for the transport block including the uplink report based on a hybrid automated repeat request (HARQ) process. In some embodiments, wherein the unscheduled uplink communication signal further includes a transmission configuration used for communicating the unscheduled uplink communication signal, the transmission configuration including at least one of a starting symbol index for the uplink report or an indication of an inclusion of the uplink report in the unscheduled uplink communication signal. In some embodiments, the method further comprises rate-matching, by the first wireless communication device, the uplink report based on a frequency tone mapping of the transmission configuration. In some embodiments, wherein the unscheduled uplink communication signal further includes uplink data multiplexed with the uplink report. In some embodiments, wherein the uplink report is communicated further based on a predetermined periodicity. In some embodiments, the method further comprises communicating, by the first wireless communication device with the second wireless communication device, an uplink report request in a first frequency band, wherein the communicating the unscheduled uplink communication signal includes communicating, by the first wireless communication device with the second wireless communication device, the uplink report in the unscheduled uplink communication signal further based on the uplink report request, the unscheduled uplink communication signal communicated in a second frequency band different from the first frequency band. In some embodiments, the method further comprises communicating, by the first wireless communication device with the second wireless communication device, an uplink report request in a frequency band, wherein the communicating the unscheduled uplink communication signal includes communicating, by the first wireless communication device with the second wireless communication device, the uplink report in the unscheduled uplink communication signal further based on the uplink report request, the unscheduled uplink communication signal communicated in the frequency band. In some embodiments, wherein the communicating the downlink communication signal includes communicating, by the first wireless communication device with the second wireless communication device, the downlink communication signal in a first frequency band, and wherein the communicating the unscheduled uplink communication signal includes communicating, by the first wireless communication device with the second wireless communication device, the unscheduled uplink communication signal in a second frequency band different from the first frequency band. In some embodiments, wherein the communicating the downlink communication signal includes communicating, by the first wireless communication device with the second wireless communication device, the downlink communication signal in a frequency band, and wherein the communicating the unscheduled uplink communication signal includes communicating, by the first wireless communication device with the second wireless communication device, the unscheduled uplink communication signal in the frequency band.

Further embodiments of the present disclosure include an apparatus comprises a transceiver configured to communicate, with a second wireless communication device, a downlink communication signal; and communicate, with the second wireless communication device, an unscheduled uplink communication signal including an uplink report associated with the downlink communication signal, the unscheduled uplink communication signal communicated based on a listen-before-talk (LBT) procedure.

In some embodiments, wherein the uplink report includes at least one of an acknowledgement (ACK) for data in the downlink communication signal, a negative-acknowledgement (NACK) for the data in the downlink communication signal, or channel information based at least on the downlink communication signal. In some embodiments, wherein the transceiver is further configured to communicate the unscheduled uplink communication signal by communicating, with the second wireless communication device, the unscheduled uplink communication signal using a resource allocated for an unscheduled uplink data transmission. In some embodiments, wherein the unscheduled uplink communication signal includes a transport block including the uplink report. In some embodiments, wherein the transceiver is further configured to communicate, with the second wireless communication device, an acknowledgement/negative-acknowledgement (ACK/NACK) for the transport block including the uplink report based on a hybrid automated repeat request (HARQ) process. In some embodiments, wherein the unscheduled uplink communication signal further includes a transmission configuration used for communicating the unscheduled uplink communication signal, the transmission configuration including at least one of a starting symbol index for the uplink report or an indication of an inclusion of the uplink report in the unscheduled uplink communication signal. In some embodiments, the apparatus further comprises a processor configured to rate-match the uplink report based on a frequency tone mapping of the transmission configuration. In some embodiments, wherein the unscheduled uplink communication signal further includes uplink data multiplexed with the uplink report. In some embodiments, wherein the uplink report is communicated further based on a predetermined periodicity. In some embodiments, wherein the transceiver is further configured to communicate, with the second wireless communication device, an uplink report request in a first frequency band; and communicate, with the second wireless communication device, the uplink report in the unscheduled uplink communication signal further based on the uplink report request, the unscheduled uplink communication signal communicated in a second frequency band different from the first frequency band. In some embodiments, wherein the transceiver is further configured to communicate, with the second wireless communication device, an uplink report request in a frequency band; and communicate, with the second wireless communication device, the uplink report in the unscheduled uplink communication signal further based on the uplink report request, the unscheduled uplink communication signal communicated in the frequency band. In some embodiments, wherein the downlink communication signal is communicated in a first frequency band, and wherein the unscheduled uplink communication signal is communicated in a second frequency band different from the first frequency band. In some embodiments, wherein the downlink communication signal and the unscheduled uplink communication signal are communicated in a same frequency band.

Further embodiments of the present disclosure include a computer-readable medium having program code recorded thereon, the program code comprising code for causing a first wireless communication device to communicate, with a second wireless communication device, a downlink communication signal; and code for causing the first wireless communication device to communicate, with the second wireless communication device, an unscheduled uplink communication signal including an uplink report associated with the downlink communication signal, the unscheduled uplink communication signal communicated based on a listen-before-talk (LBT) procedure.

In some embodiments, wherein the uplink report includes at least one of an acknowledgement (ACK) for data in the downlink communication signal, a negative-acknowledgement (NACK) for the data in the downlink communication signal, or channel information based at least on the downlink communication signal. In some embodiments, wherein the code for causing the first wireless communication device to communicate the unscheduled uplink communication signal is further configured to communicate, with the second wireless communication device, the unscheduled uplink communication signal using a resource allocated for an unscheduled uplink data transmission. In some embodiments, wherein the unscheduled uplink communication signal includes a transport block including the uplink report. In some embodiments, the computer-readable medium further comprises code for causing the first wireless communication device to communicate, with the second wireless communication device, an acknowledgement/negative-acknowledgement (ACK/NACK) for the transport block including the uplink report based on a hybrid automated repeat request (HARQ) process. In some embodiments, wherein the unscheduled uplink communication signal further includes a transmission configuration used for communicating the unscheduled uplink communication signal, the transmission configuration including at least one of a starting symbol index for the uplink report or an indication of an inclusion of the uplink report in the unscheduled uplink communication signal. In some embodiments, the computer-readable medium further comprises code for causing the first wireless communication device to rate-match the uplink report based on a frequency tone mapping of the transmission configuration. In some embodiments, wherein the unscheduled uplink communication signal further includes uplink data multiplexed with the uplink report. In some embodiments, wherein the uplink report is communicated further based on a predetermined periodicity. In some embodiments, the computer-readable medium further comprises code for causing the first wireless communication device to communicate, with the second wireless communication device, an uplink report request in a first frequency band, wherein the code for causing the first wireless communication device to communicate the unscheduled uplink communication signal is further configured to communicate, with the second wireless communication device, the uplink report in the unscheduled uplink communication signal further based on the uplink report request, the unscheduled uplink communication signal communicated in a second frequency band different from the first frequency band. In some embodiments, the computer-readable medium further comprises code for causing the first wireless communication device to communicate, with the second wireless communication device, an uplink report request in a frequency band, wherein the code for causing the first wireless communication device to communicate the unscheduled uplink communication signal is further configured to communicate, with the second wireless communication device, the uplink report in the unscheduled uplink communication signal further based on the uplink report request, the unscheduled uplink communication signal communicated in the frequency band. In some embodiments, wherein the code for causing the first wireless communication device to communicate the downlink communication signal is further configured to communicate, with the second wireless communication device, the downlink communication signal in a first frequency band, and wherein the code for causing the first wireless communication device to communicate the unscheduled uplink communication signal is further configured to communicate, with the second wireless communication device, the unscheduled uplink communication signal in a second frequency band different from the first frequency band. In some embodiments, wherein the code for causing the first wireless communication device to communicate the downlink communication signal is further configured to communicate, with the second wireless communication device, the downlink communication signal in a frequency band, and wherein the code for causing the first wireless communication device to communicate the unscheduled uplink communication signal is further configured to communicate, with the second wireless communication device, the unscheduled uplink communication signal in the frequency band.

Further embodiments of the present disclosure include an apparatus comprising means for communicating, with a second wireless communication device, a downlink communication signal; and means for communicating, with the second wireless communication device, an unscheduled uplink communication signal including an uplink report associated with the downlink communication signal, the unscheduled uplink communication signal communicated based on a listen-before-talk (LBT) procedure.

In some embodiments, wherein the uplink report includes at least one of an acknowledgement (ACK) for data in the downlink communication signal, a negative-acknowledgement (NACK) for the data in the downlink communication signal, or channel information based at least on the downlink communication signal. In some embodiments, wherein the means for communicating the unscheduled uplink communication signal is further configured to communicate, with the second wireless communication device, the unscheduled uplink communication signal using a resource allocated for an unscheduled uplink data transmission. In some embodiments, wherein the unscheduled uplink communication signal includes a transport block including the uplink report. In some embodiments, the apparatus further comprises means for communicating, with the second wireless communication device, an acknowledgement/negative-acknowledgement (ACK/NACK) for the transport block including the uplink report based on a hybrid automated repeat request (HARQ) process. In some embodiments, wherein the unscheduled uplink communication signal further includes a transmission configuration used for communicating the unscheduled uplink communication signal, the transmission configuration including at least one of a starting symbol index for the uplink report or an indication of an inclusion of the uplink report in the unscheduled uplink communication signal. In some embodiments, the apparatus further comprises means for rate-matching the uplink report based on a frequency tone mapping of the transmission configuration. In some embodiments, wherein the unscheduled uplink communication signal further includes uplink data multiplexed with the uplink report. In some embodiments, wherein the uplink report is communicated further based on a predetermined periodicity. In some embodiments, the apparatus further comprises means for communicating, with the second wireless communication device, an uplink report request in a first frequency band, wherein the means for communicating the unscheduled uplink communication signal is further configured to communicate, with the second wireless communication device, the uplink report in the unscheduled uplink communication signal further based on the uplink report request, the unscheduled uplink communication signal communicated in a second frequency band different from the first frequency band. In some embodiments, the apparatus further comprises means for communicating, with the second wireless communication device, an uplink report request in a frequency band, wherein the means for communicating the unscheduled uplink communication signal is further configured to communicate, with the second wireless communication device, the uplink report in the unscheduled uplink communication signal further based on the uplink report request, the unscheduled uplink communication signal communicated in the frequency band. In some embodiments, wherein the means for communicating the downlink communication signal is further configured to communicate, with the second wireless communication device, the downlink communication signal in a first frequency band, and wherein the means for communicating the unscheduled uplink communication signal is further configured to communicate, with the second wireless communication device, the unscheduled uplink communication signal in a second frequency band different from the first frequency band. In some embodiments, wherein the means for communicating the downlink communication signal is further configured to communicate, with the second wireless communication device, the downlink communication signal in a frequency band, and wherein the means for communicating the unscheduled uplink communication signal is further configured to communicate, with the second wireless communication device, the unscheduled uplink communication signal in the frequency band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    communicating, by a first wireless communication device with a second wireless communication device, a resource configuration for communicating an unscheduled physical uplink shared channel (PUSCH) signal;
    communicating, by the first wireless communication device with the second wireless communication device, an uplink data request configured to trigger communication of uplink data;
    communicating, by the first wireless communication device with the second wireless communication device in a scheduled resource, downlink (DL) data, wherein the DL data is associated with a first hybrid repeat request (HARQ) process; and
    communicating, by the first wireless communication device with the second wireless communication device, the unscheduled PUSCH signal in an unscheduled uplink resource, wherein the communicating the unscheduled PUSCH signal is based on the resource configuration, the unscheduled PUSCH including:
        unscheduled uplink control information (UCI), wherein the unscheduled UCI is associated with a second HARQ process, wherein the second HARQ process is different from the first HARQ process;
        hybrid automated repeat request (HARQ) acknowledgement/negative-acknowledgement (ACK/NACK) information associated with the DL data, wherein the HARQ ACK/NACK information is multiplexed with the unscheduled UCI, wherein the HARQ ACK/NACK information is associated with the first HARQ process; and
        the uplink data, wherein the uplink data is multiplexed with the unscheduled UCI based on mapping the unscheduled PUSCH signal to a resource allocated to the unscheduled PUSCH signal according to the resource configuration and mapping the uplink data to one or more resources which are unoccupied by the unscheduled UCI, wherein the uplink data is associated with the second HARQ process.

2. The method of claim 1, wherein the uplink data includes channel state information (CSI).

3. The method of claim 1, wherein the uplink data comprises an uplink report.

4. The method of claim 1, wherein the unscheduled PUSCH signal further comprises at least one of channel state information (CSI) part 1 or CSI part 2.

5. The method of claim 4, wherein the HARQ ACK/NACK information, the unscheduled UCI, and the at least one of the CSI part 1 or the CSI part 2 are multiplexed with the unscheduled PUSCH signal.

6. The method of claim 4, wherein the unscheduled PUSCH signal further includes unscheduled uplink data multiplexed with the unscheduled UCI, the HARQ ACK/NACK information, and the at least one of the CSI part 1 or the CSI part 2.

7. The method of claim 1, wherein the unscheduled PUSCH signal includes coded bits for the HARQ ACK/NACK information and at least one of channel state information (CSI) part 1, CSI part 2, or the unscheduled UCI.

8. The method of claim 7, wherein the unscheduled PUSCH signal includes coded bits for unscheduled uplink data multiplexed with the coded bits for the HARQ ACK/NACK information and the at least one of the CSI part 1, the CSI part 2, or the unscheduled UCI.

9. The method of claim 1, wherein the communicating the unscheduled PUSCH signal includes:
communicating, by the first wireless communication device with the second wireless communication device, the uplink data based on a predetermined periodicity.

10. The method of claim 1, wherein:
the communicating the resource configuration comprises communicating the resource configuration in a first frequency band;
the communicating the uplink data request comprises communicating the uplink data request in a second frequency band; and
the second frequency band is a higher frequency band than the first frequency band.

11. The method of claim 1, wherein the unscheduled PUSCH signal further includes a transmission configuration including a starting symbol index for the uplink data and an indication of inclusion of the uplink data in the unscheduled PUSCH.

12. A user equipment (UE) for wireless communication, comprising:
one or more memories storing processor-executable code; and
one or more processors coupled with the one or more memories and individually or collectively operable to execute the code to case the UE to:
communicate, with a wireless communication device, a resource configuration for communicating an unscheduled physical uplink shared channel (PUSCH) signal;
communicate, with the wireless communication device, an uplink data request configured to trigger communication of uplink data;
communicate, with the wireless communication device, downlink (DL) data, wherein the DL data is associated with a first hybrid repeat request (HARQ) process; and
communicate, with the wireless communication device based on the resource configuration, the unscheduled PUSCH signal including:
unscheduled uplink control information (UCI), wherein the unscheduled UCI is associated with a second HARQ process, wherein the second HARQ process is different from the first HARQ process;
hybrid automated repeat request (HARQ) acknowledgement/negative-acknowledgement (ACK/NACK) information associated with the DL data, wherein the HARQ ACK/NACK information is multiplexed with the unscheduled UCI, wherein the HARQ ACK/NACK information is associated with the first HARQ process; and
the uplink data, wherein the uplink data is multiplexed with the unscheduled UCI based on mapping the unscheduled PUSCH signal to a resource allocated to the unscheduled PUSCH signal according to the resource configuration and mapping the uplink data to one or more resources which are unoccupied by the unscheduled UCI, wherein the uplink data is associated with the second HARQ process.

13. The UE of claim 12, wherein the uplink data includes channel state information (CSI).

14. The UE of claim 12, wherein the uplink data comprises an uplink report.

15. The UE of claim 14, wherein the unscheduled PUSCH signal further comprises at least one of channel state information (CSI) part 1 or CSI part 2.

16. The UE of claim 15, wherein the HARQ ACK/NACK information, the unscheduled UCI, and the at least one of the CSI part 1 or the CSI part 2 are multiplexed with the unscheduled PUSCH signal.

17. The UE of claim 15, wherein the unscheduled PUSCH signal further includes unscheduled uplink data multiplexed with the unscheduled UCI, the HARQ ACK/NACK information, and the at least one of the CSI part 1 or the CSI part 2.

18. The UE of claim 12, wherein the unscheduled PUSCH signal includes coded bits for the HARQ ACK/NACK information and at least one of channel state information (CSI) part 1, CSI part 2, or the unscheduled UCI.

19. The UE of claim 18, wherein the unscheduled PUSCH signal includes coded bits for unscheduled uplink data multiplexed with the coded bits for the HARQ ACK/NACK information and the at least one the CSI part 1, the CSI part 2, or the unscheduled UCI.

20. The UE of claim 12, wherein the unscheduled PUSCH signal further includes a transmission configuration including a starting symbol index for the uplink data and an indication of inclusion of the uplink data in the unscheduled PUSCH.

21. A non-transitory computer-readable medium having program code recorded thereon, the program code comprising:
code for causing a first wireless communication device to communicate, with a second wireless communication device, a resource configuration for communicating an unscheduled physical uplink shared channel (PUSCH) signal;
code for causing the first wireless communication device to communicate, with the second wireless communication device an uplink data request configured to trigger communication of uplink data;
code for causing the first wireless communication device to communicate with the second wireless communication device in a scheduled resource, downlink (DL) data, wherein the DL data is associated with a first hybrid repeat request (HARQ) process; and
code for causing the first wireless communication device to communicate, with the second wireless communication device, the unscheduled PUSCH signal in an unscheduled uplink resource, wherein the communicating the unscheduled PUSCH signal is based on the resource configuration, the unscheduled PUSCH signal including:
unscheduled uplink control information (UCI), wherein the unscheduled UCI is associated with a second HARQ process, wherein the second HARQ process is different from the first HARQ process;

hybrid automated repeat request (HARQ) acknowledgement/negative-acknowledgement (ACK/NACK) information associated with the DL data, wherein the HARQ ACK/NACK information is multiplexed with the unscheduled UCI, wherein the HARQ ACK/NACK information is associated with the first HARQ process; and the uplink data, wherein the uplink data is multiplexed with the unscheduled UCI based on mapping the unscheduled PUSCH signal to a resource allocated to the unscheduled PUSCH signal according to the resource configuration and mapping the uplink data to one or more resource which are unoccupied by the unscheduled UCI, wherein the uplink data is associated with the second HARQ process.

22. The non-transitory computer-readable medium of claim 21, wherein the uplink data includes channel state information (CSI).

23. The non-transitory computer-readable medium of claim 21, wherein the unscheduled PUSCH signal further comprises at least one of channel state information (CSI) part 1 or CSI part 2.

24. The non-transitory computer-readable medium of claim 23, wherein the HARQ ACK/NACK information, the unscheduled UCI, and the at least one of the CSI part 1 or the CSI part 2 are multiplexed with the unscheduled PUSCH signal.

25. The non-transitory computer-readable medium of claim 23, wherein the unscheduled PUSCH signal further includes unscheduled uplink data multiplexed with the unscheduled UCI, the HARQ ACK/NACK information, and the at least one of the CSI part 1 or the CSI part 2.

26. The non-transitory computer-readable medium of claim 21, wherein the unscheduled PUSCH signal further includes a transmission configuration including a starting symbol index for the uplink data and an indication of inclusion of the uplink data in the unscheduled PUSCH.

* * * * *